US010887155B2

(12) United States Patent
Keerthi et al.

(10) Patent No.: US 10,887,155 B2
(45) Date of Patent: Jan. 5, 2021

(54) SYSTEM AND METHOD FOR A UNIFIED CONNECTED NETWORK

(71) Applicant: SONY CORPORATION, Tokyo (JP)

(72) Inventors: Kishore Keerthi, Secunderabad (IN); Pramod Chintalapoodi, San Diego, CA (US); Sho Tanaka, Tokyo (JP)

(73) Assignee: SONY CORPORATION, Tokyo (JP)

(*) Notice: Subject to any disclaimer, the term of this patent is extended or adjusted under 35 U.S.C. 154(b) by 267 days.

(21) Appl. No.: 14/984,636

(22) Filed: Dec. 30, 2015

(65) Prior Publication Data
US 2017/0195166 A1 Jul. 6, 2017

(51) Int. Cl.
| | |
|---|---|
| *H04L 12/24* | (2006.01) |
| *G08G 1/0968* | (2006.01) |
| *H04L 29/08* | (2006.01) |
| *G01C 21/34* | (2006.01) |
| *H04L 12/26* | (2006.01) |

(52) U.S. Cl.
CPC .......... *H04L 41/06* (2013.01); *G01C 21/3484* (2013.01); *G08G 1/096811* (2013.01); *H04L 43/04* (2013.01); *H04L 67/04* (2013.01); *H04L 67/10* (2013.01); *H04L 67/12* (2013.01); *H04L 67/16* (2013.01); *H04L 67/18* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 2004/0230373 | A1* | 11/2004 | Tzamaloukas | G01C 21/28 701/468 |
| 2005/0185398 | A1 | 8/2005 | Scannell | |
| 2005/0222716 | A1* | 10/2005 | Tengler | G01C 21/26 701/1 |
| 2009/0088962 | A1* | 4/2009 | Jones | G06F 16/9537 701/519 |
| 2014/0074345 | A1* | 3/2014 | Gabay | G07C 5/008 701/31.4 |
| 2014/0167929 | A1* | 6/2014 | Shim | G08C 17/02 340/12.5 |

(Continued)

OTHER PUBLICATIONS

Eamonn Corrigan, "Silver Spring Networks Response to AEMC Power of Choice Draft Report", Oct. 15, 2012, pp. 15, Silver Spring Networks Pty Ltd, Australia.

*Primary Examiner* — Genna M Mott
(74) *Attorney, Agent, or Firm* — Chip Law Group

(57) ABSTRACT

Various aspects of a system and method to provide a unified connected network are disclosed herein. The system comprises a server communicatively coupled to an electronic control unit (ECU) of a vehicle and a first set of electronic devices. Upon detection of an event, the server receives a first set of data from the ECU and/or a second set of data from the first set of electronic devices associated with a plurality of services. The server extracts information from the received first set and/or the second set of data, based on analysis of the received first set and/or the second set of data. The server further determines one or more responses that correspond to the detected event, based on the extracted information. The server further transmits the determined one or more responses to a second set of electronic devices associated with the plurality of services.

17 Claims, 8 Drawing Sheets

(56) References Cited

U.S. PATENT DOCUMENTS

| | | | |
|---|---|---|---|
| 2014/0309789 A1* | 10/2014 | Ricci | G08B 25/016 700/276 |
| 2015/0046298 A1* | 2/2015 | Zwakhals | G06Q 10/087 705/28 |
| 2015/0066231 A1 | 3/2015 | Clifton | |
| 2015/0293509 A1* | 10/2015 | Bankowski | G05B 15/02 700/275 |
| 2016/0132030 A1* | 5/2016 | Marti | G05B 15/02 700/275 |
| 2016/0216123 A1* | 7/2016 | Liao | G01C 21/3484 |
| 2017/0017734 A1* | 1/2017 | Groh | G06F 17/5009 |

* cited by examiner

SYSTEM AND METHOD FOR A UNIFIED CONNECTED NETWORK

CROSS-REFERENCE TO RELATED APPLICATIONS/INCORPORATION BY REFERENCE

None.

FIELD

Various embodiments of the disclosure relate to a system and method for a unified connected network. More specifically, various embodiments of the disclosure relate to a system and method for an intelligent unified connected network that provides a machine-to-machine (M2M) connectivity application for a plurality of electronic devices.

BACKGROUND

Recent advancements in the field of data processing technology have led to development of systems that may process data and provide assistance to a user for execution of a task. Such processed data may be received from various data sources. The various data sources may correspond to an event and/or a first set of electronic devices associated with the user. The assistance may be provided based on a mapping of a type of an event and one or more pre-programmed responses that correspond to the type of the event. Such a mapping may be pre-stored at a server. The server may receive data associated with the event occurred. The server may process the received data and generate the one or more pre-programmed responses that correspond to the type of occurred event. In accordance with the generated one or more pre-programmed responses, one or more services may be triggered to execute a task.

However, in certain scenarios, the volume of data generated for one or more events associated with the user may be huge. Thus, it may not be practical to create the mapping of the type of an event and thereby determine the one or more pre-programmed responses that correspond to the type of the event. There may be another scenario in which the pre-programmed one or more responses that correspond to a type of event may not exist in the stored mapping. In such a scenario, no service may be triggered to execute the task. There may be yet another scenario in which the server may only be configured to process data that corresponds to a single domain, such as telematics. In such a scenario, the server may not be able to process data from other domains, such as banking, medical, and/or the like. Therefore, it may be desirable that the server generates intelligent on-demand responses that correspond to the occurred event for personalized device assistance. Such intelligent on-demand responses may be provided based on extended services as required in real time. It may be further desirable that the server processes data that spans across multiple domains, via a machine-to-machine (M2M) connectivity application.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method for a unified connected network is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
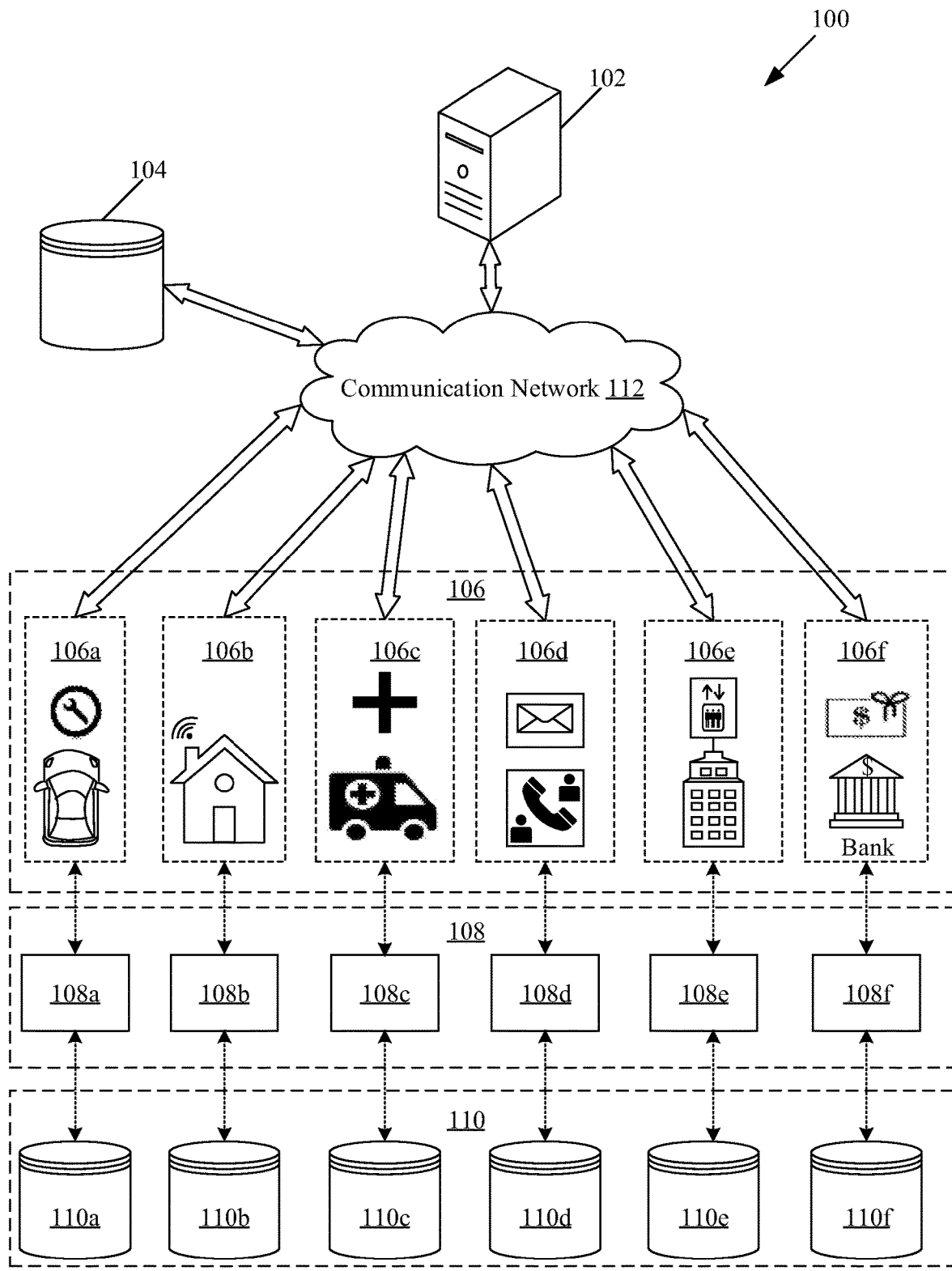
FIG. 1 is a block diagram that illustrates a network environment that provides a unified connected network, in accordance with an embodiment of the disclosure.

Various implementations may be found in a system and/or method to provide a unified connected network. Exemplary aspects of the disclosure may comprise a method to receive, by a server, a first set of data from an electronic control unit (ECU) of a vehicle, and/or a second set of data from a first set of electronic devices associated with a plurality of services. The first set and/or the second set of data may be received based on detection of an event by the ECU. The ECU, the first set of electronic devices, and a second set of electronic devices may be communicatively coupled to the server. The method may further comprise extraction of information, by the server, from the received first set of data and/or the received second set of data. The information may be extracted based on analysis of the received first set of data and/or the received second set of data. The method may further comprise determination, by the server, of one or more responses that correspond to the detected event. The determination of the one or more responses may be based on the extracted information. The method may further comprise transmission, by the server, of the one or more responses to a second set of electronic devices associated with the plurality of services. In accordance with an embodiment, the extraction of the information may be based on one or more machine-learning algorithms.

In accordance with an embodiment, the determined one or more responses may correspond to an optimal time to travel to a destination. In accordance with an embodiment, the determined one or more responses correspond to switch ON or switch OFF of the second set of electronic devices associated with the plurality of services. In accordance with an embodiment, the determined one or more responses may be further transmitted to the vehicle and/or the second set of electronic devices, via an established communication channel. In accordance with an embodiment, the second set of electronic devices may be controlled by the one or more of the plurality of services, based on the determined one or more responses and an advisory application.

In accordance with an embodiment, the server may trigger a first service that may generate recommendations that correspond to one or more of the plurality of services, based on the determined one or more responses. Based on the determined one or more responses, the server may be configured to trigger a second service that may render the generated recommendations at the vehicle and/or the first set of electronic devices. In accordance with an embodiment, based on the determined one or more responses, the server may be configured to trigger a third service that performs one or more actions that correspond to the determined one or more responses. The third service may be triggered based on information associated with a user of the vehicle and/or the first set of electronic devices. The information may comprise one or more of a set of permissions pre-defined by the user, a set of pre-stored user preferences that correspond to the user, and/or an input provided by the user.

In accordance with an embodiment, the determined one or more responses may be customized based on at least the first set of data received from the ECU. The server may be configured to render a personalized user interface (UI) for the first set of electronic devices and the second set of electronic devices associated with the plurality of services.

In accordance with an embodiment, the first set of data corresponds to a preferred time to travel to a destination, Global Positioning Satellite (GPS) coordinates of the vehicle, one or more motion and/or vehicle parameters of the vehicle, and/or the set of pre-stored user preferences associated with a user of the vehicle. The second set of data may correspond to a traffic pattern associated with a location, parameters to operate the first set of electronic devices, one or more emergency contacts associated with a user of the vehicle, and/or one or more preferred vehicle maintenance service providers of the user.

In accordance with an embodiment, the plurality of services may correspond to a set of cloud-based services. The set of cloud-based services may correspond to one or more of automotive services, banking services, E-commerce services, home automation services, health-care services, location-based services, Information and Technology (IT) services, and/or infrastructure-based services.

FIG. 1 is a block diagram that illustrates a network environment that provides a unified connected network, in accordance with an embodiment of the disclosure. With reference to FIG. 1, there is shown a network environment 100 that may include a server 102, a central database 104, a set of cloud-based services 106, a plurality of client systems 108, a plurality of local databases 110, and/or a communication network 112.

The set of cloud-based services 106 may include one or more services, such as an automotive service 106a, a home automation service 106b, a health-care service 106c, an enterprise resource planning (ERP) service 106d, an infrastructure-based service 106e, and/or miscellaneous services 106f. The plurality of client systems 108 may include client systems, as depicted by 108a to 108f in FIG. 1. The plurality of local databases 110 may include local databases, as depicted by 110a to 110f in FIG. 1.

Each of the set of cloud-based services 106 may be communicatively coupled with each other, via the communication network 112. Each of the set of cloud-based services 106 may be further communicatively coupled with the client systems 108a to 108f, respectively. Further, each of the set of cloud-based services 106 and the plurality of client systems 108 may be communicatively coupled with the local databases 110a to 110f, respectively. The server 102, the central database 104, and the set of cloud-based services 106 may be communicatively coupled with each other, via the communication network 112. Further, the set of cloud-based services 106, the plurality of client systems 108, and the plurality of local databases 110 may be communicatively coupled with each other, via the communication network 112.

Figure 2A:
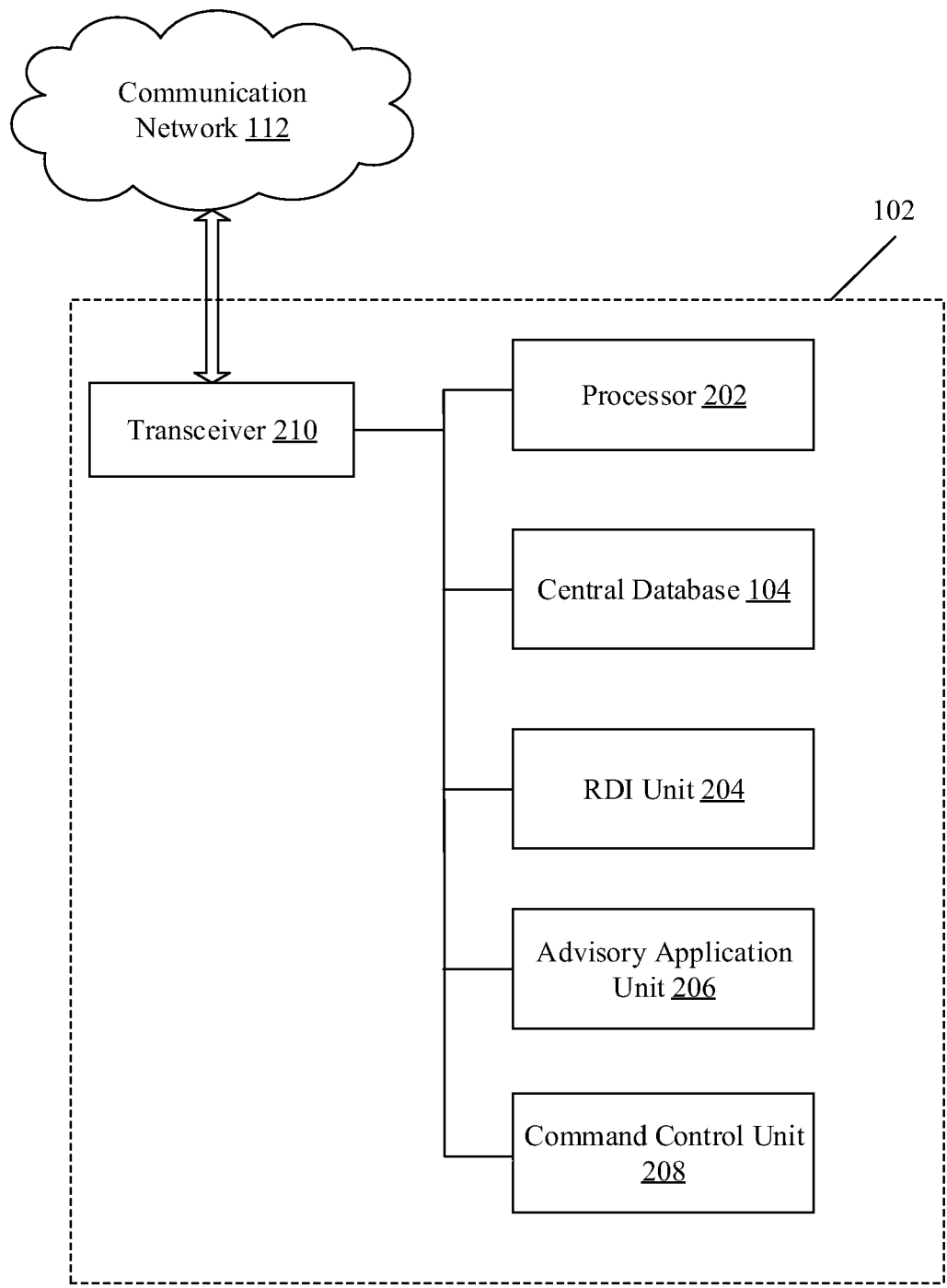
FIGS. 2A, 2B, and 2C are block diagrams that illustrate various exemplary components and systems of a server, a client system, and a vehicle, respectively, in a unified connected network, in accordance with an embodiment of the disclosure.
Figure 2B:
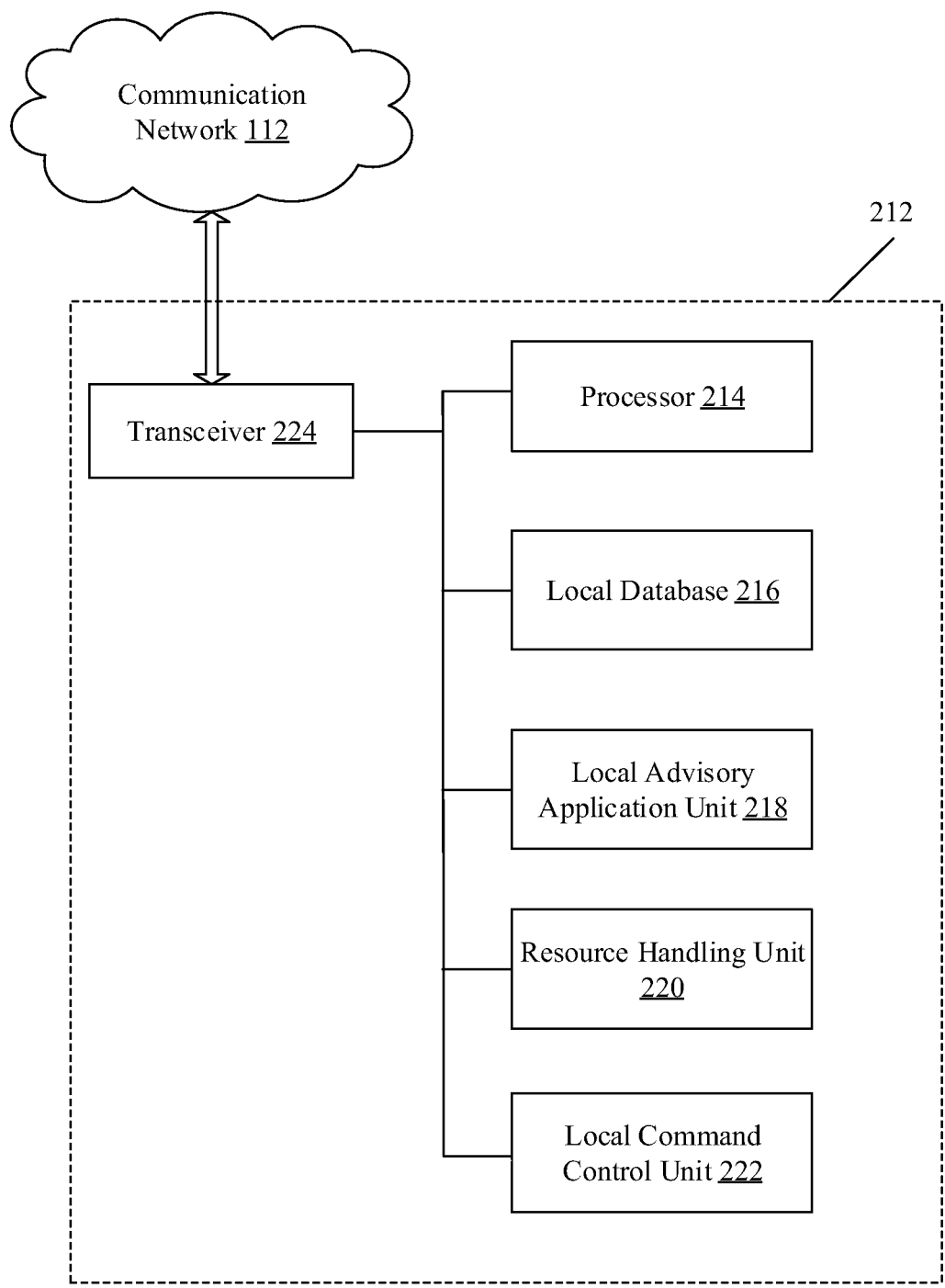
Figure 2C:
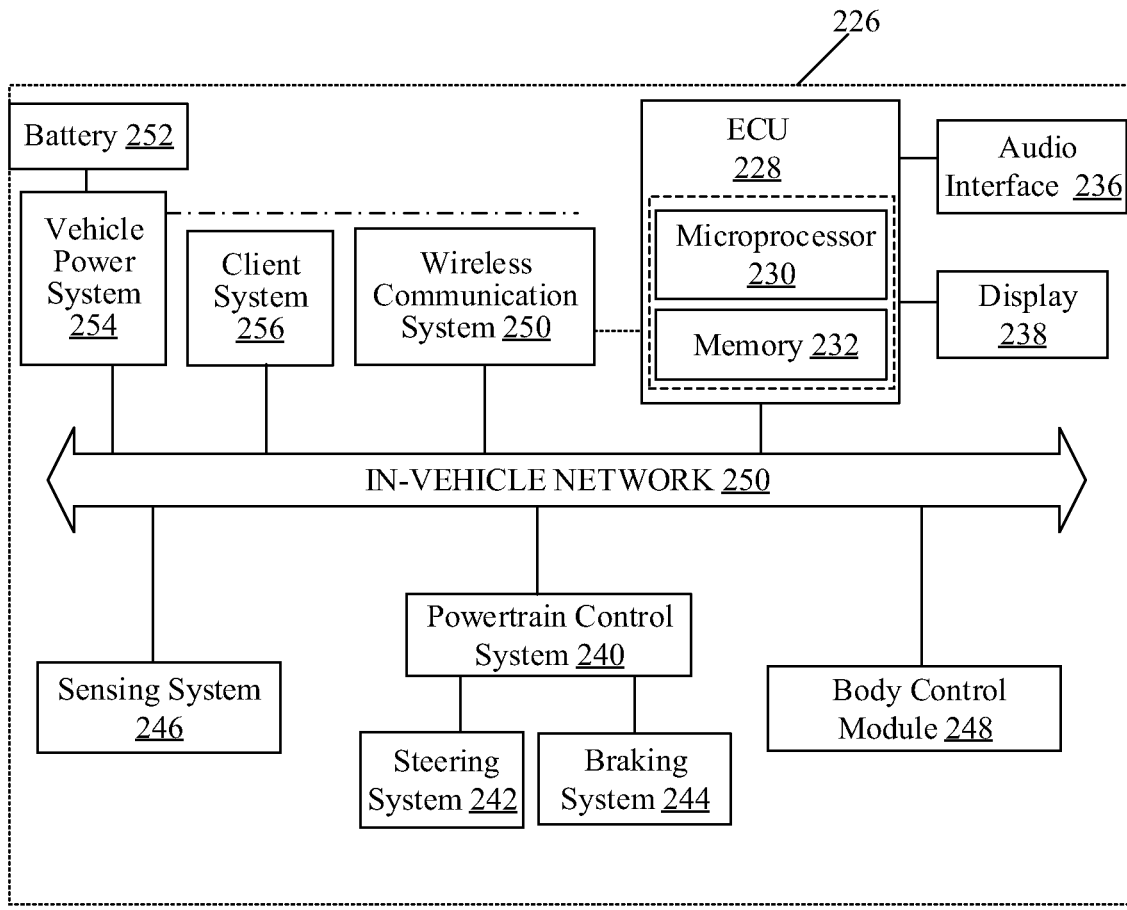

The server 102 may comprise suitable logic, circuitry, interfaces, and/or code that may be configured to receive a first set of data from a first set of electronic devices, such as an electronic control unit (ECU) 228 of a vehicle 226 (described in FIG. 2C). The server 102 may be further configured to receive a second set of data associated with the first set of electronic devices from the central database 104 and/or the set of cloud-based services 106. The server 102 may be configured to transmit the received first set and/or the second set of data to the central database 104 for storage and/or update, via the communication network 112. The server 102 may be further configured to determine one or more responses, based on an analysis, such as pattern analysis), of the received first and/or the second set of data. In accordance with an embodiment, the server 102 may be implemented as a plurality of cloud-based resources by use of several technologies that are well known to those skilled in the art. Further, the server 102 may be associated with a single or multiple service providers. Examples of the server 102 may include, but are not limited to, Apache™ HTTP Server, Microsoft® Internet Information Services (IIS), IBM® Application Server, Sun Java™ System Web Server, and/or a file server.

The central database 104 may comprise suitable, logic, circuitry, interfaces, and/or code that may be configured to store the first and/or the second set of data received from the server 102, via the communication network 112. The central database 104 may be further configured to store the one or more responses, generated by the server 102, which correspond to an occurred event. Examples of the central database 104 may include, but are not limited to, a hierarchical database, a network database, a relational database, and/or an object-oriented database.

A person with ordinary skill in the art will understand that the scope of the disclosure is not limited to implementation of the server 102 and the central database 104 as separate entities. In accordance with an embodiment, the functionalities of the central database 104 may be implemented in the server 102, without departure from the scope of the disclosure.

The set of cloud-based services 106 may comprise one or more services that may facilitate in generation of the first and/or the second set of data. Each of the set of cloud-based services 106 may be provided by corresponding service provider (not shown). The first set of data may correspond to the first set of electronic devices, such as the ECU 228 of the vehicle 226 (as described in FIG. 2C), associated with the set of cloud-based services 106. The second set of data may correspond to the first set of electronic devices associated with the set of cloud-based services 106. The set of cloud-based services 106, in conjunction with the server 102, may be further configured to generate one or more recommendations, based on the one or more responses generated by the server 102. Further, each of the set of cloud-based services 106 may be communicatively coupled to the second set of electronic devices, such as electrical appliances and/or electronic systems, via the communication network 112.

In accordance with an embodiment, the one or more recommendations may be generated, based on one or more events, such as a breakdown of a vehicle (such as the vehicle 226 (as described in FIG. 2C)). The generated one or more recommendations may be rendered on the first set of electronic devices, such as a smartphone of the driver of the vehicle. The server 102 may be configured to transmit one or more responses and perform one or more actions at the second set of electronic devices, such as a smartphone of a mechanic and the driver's family members, based on at least the automotive service 106a and the home automation service 106b.

In accordance with an embodiment, one or more recommendations may be generated based on one or more events, such as a critical medical finding, of a patient associated with the first set of electronic devices, such as medical equipment. The generated one or more recommendations may be rendered on the first set of electronic devices, such as a smartphone of the driver of the vehicle. The server 102 may be configured to transmit one or more responses and perform one or more actions on the second set of electronic devices, such as a mobile phone of a physician, based on at least the health-care service 106c.

In accordance with an embodiment, one or more recommendations may be generated based on one or more events, such as an employee struck in the traffic. The generated one or more recommendations may be rendered on the first set of electronic devices, such as a smartphone of an employee of an organization. The server 102 may be configured to transmit one or more responses, such as postponement of a meeting, to the second set of electronic devices, such as mobile phone of a supervisor of the employee, based on at least the ERP service 106d.

In accordance with an embodiment, the one or more recommendations may be generated based on one or more events associated with the infrastructure facilities of a building. The generated one or more recommendations may be rendered on the first set of electronic devices, such as a smartphone of the site manager of the infrastructure facilities of the building. The server 102 may be configured to transmit one or more responses to the second set of electronic devices, such as a smartphone of the infrastructure owner, based on at least the infrastructure-based service 106e.

In accordance with an embodiment, the one or more recommendations may be generated based on one or more events associated with one or more services. Examples of the one or more services may include, but are not limited to, banking transactions of a user, stock market portfolio, and/or personal events associated with the user, such as wedding anniversary. The generated one or more recommendations may be rendered on the first set of electronic devices. The server 102 may be configured to transmit one or more responses to the second set of electronic devices, based on at least the miscellaneous services 106f.

The plurality of client systems 108 may comprise suitable, logic, circuitry, interfaces, and/or code that may be implemented in the first set of electronic devices and the second set of electronic devices. Examples of the first set of electronic devices and the second set of electronic devices may include one or more of an infotainment system, a mobile phone, a home area network device (such as a personal digital assistant), and/or the like. In accordance with an embodiment, the plurality of client systems 108 (implemented in the first set of electronic devices) are configured to transmit the first set of data associated with the first set of electronic devices to the server 102. In accordance with an embodiment, the plurality of client systems 108 (implemented in the second set of electronic devices) are configured to control the operation of the second set of electronic devices, based on the one or more responses received from the server 102. In an implementation, the unified connected network may comprise a plurality of instances of the plurality of client systems 108 and the local databases 110, as explained above. Examples of implementation of the plurality of client systems 108 may be similar to that of the server 102. A person with ordinary skill in the art will understand that the disclosure is not limited to implementation of the plurality of client systems 108 in the first and second sets of electronic devices. Rather, the plurality of client systems 108 may also be implemented as separated entities communicatively coupled to the first set of electronic devices, without deviation from the scope of the disclosure.

The plurality of local databases 110 may comprise suitable, logic, circuitry, interfaces, and/or code that may be configured to buffer the received first set and/or the second set of data. The plurality of local databases 110 may be further configured to store the one or more responses, which correspond to an occurrence of an event, received from the server 102. Examples of implementation of the plurality of local databases 110 may be similar to that of the central database 104.

The communication network 112 may include a medium through which the server 102, the central database 104, and/or the set of cloud-based services 106 may communicate with each other. Examples of the communication network 112 may include, but are not limited to, a dedicated short-range communication (DSRC) network, a connected vehicle network (CVN), a mobile ad hoc network (MANET), a vehicular ad hoc network (VANET), Intelligent vehicular ad-hoc network (InVANET), Internet based mobile ad hoc networks (IMANET), a wireless sensor network (WSN), a wireless mesh network (WMN), the Internet, a cellular network, such as a long-term evolution (LTE) network, a cloud network, a Wireless Fidelity (Wi-Fi) network, and/or a Wireless Local Area Network (WLAN). Various electronic devices in the network environment 100 may be configured to connect to the communication network 112, in accordance with various wireless communication protocols. Examples of such wireless communication protocols may include, but are not limited to, IEEE 802.11, 802.11p, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term evolution (LTE), File Transfer Protocol (FTP), ZigBee, EDGE, infrared (IR), and/or Bluetooth (BT) communication protocols.

In operation, the server 102 may be configured to receive a first set of data from the client system 108a (of the plurality of client systems 108) implemented in the first set of electronic devices, such as the ECU 228 of the vehicle 226 (as described in FIG. 2C). The first set of data may correspond to one or more services provided by the set of cloud-based services 106 associated with the vehicle. The reception of the first set of data may be based on an occurrence of an event, such as a vehicle breakdown, associated with the vehicle.

In accordance with an embodiment, based on the detection of the event, the server 102 may be configured to retrieve a second set of data from one or more of the set of cloud-based services 106, such as the home automation service 106b. In accordance with an embodiment, the server 102 may be configured to retrieve a second set of data pre-stored at the centralized database 104. The server 102 may be further configured to extract and learn intelligent information from the received first and/or second set of data, based on one or more of a pattern analysis algorithm, an adaptive algorithm, and/or a machine learning algorithm retrieved from the central database 104. Such extraction and learning of the intelligent information from the first set and/or the second set of data may further correspond to related data intelligence (RDI) of the server 102. The RDI may facilitate the server 102 to establish a relationship of the intelligence derived from the extracted and learned information with one or more real-time services provided by the set of cloud-based services 106.

The server 102 may be configured to determine one or more responses based on the pattern analysis of the received first set and/or the second set of data and the RDI derived there from. The server 102 may be further configured to trigger one or more application program interfaces (APIs) based on the determined one or more responses. The server 102 may be further configured to generate one or more recommendations based on the triggered one or more APIs. The server 102 may be further configured to transmit the generated one or more recommendations to the client system 108*a*. The client system 108*a* may be configured to render the received one or more recommendations on a user interface (UI) associated with the first set of electronic devices.

In accordance with an embodiment, based on the determined one or more responses, the server 102 may be configured to generate one or more control instructions for another client system, such as the client system 108*b*. Based on the generated one or more control instructions, the server 102 may be configured to perform one or more actions at the second set of electronic devices, via the client system 108*b*.

In accordance with an exemplary scenario, the automotive service 106*a* may be installed in the first set of electronic devices, such as an ECU of a vehicle. For example, the ECU may correspond to an ECU 228 of a vehicle 226, as described in FIG. 2C. Based on an occurrence of an event, the ECU of the vehicle may be configured to generate a first set of data. In an instance, the event may correspond to breakdown of the vehicle. In another instance, the event may correspond to reception of a request for determination of optimal time to travel to a location from a user associated with the vehicle.

In accordance with an embodiment, the first set of data may be generated based on sensor data received from one or more sensors installed within the vehicle. In accordance with an embodiment, the first set of data may be generated based on data manually provided by the user, via the ECU of the vehicle. In an instance, when the event corresponds to the vehicle breakdown, the first set of data may include information, such as vehicle breakdown error code data, geographical location of the vehicle, date and time of breakdown, and/or the like. In another instance, when the event corresponds to the reception of the request for determination of optimal time to travel, the first set of data may include one or more of a preferred time to travel to a destination, a set of pre-stored user preferences, one or more motion and/or vehicle parameters of the vehicle, and a location of the user with respect to one or more other users associated with the user via a social network. The first set of data may further include one or more health parameters of the user of the vehicle.

In accordance with an embodiment, the client system 108*a* associated with the ECU of the vehicle may transmit the first set of data to the server 102, via the communication network 112, upon detection of such an event. In such a case, the client system 108*a* may be associated with the automotive service 106*a*. The client system 108*a* may be further configured to store the received first set of data in the corresponding local database 110*a*.

In accordance with an embodiment, the server 102 may be configured to receive a second set of data from one or more electronic devices associated with one or more services, such as the home automation service 106*b*, of the set of cloud-based services 106. The second set of data may comprise one or more operating parameters of the first set of electronic devices associated with the one or more services of the set of cloud-based services 106. The second set of data may comprise traffic data received from a service provided by a traffic monitoring server. The traffic data may include a traffic pattern with respect to the location of the vehicle of the user. The second set of data may further comprise one or more emergency contacts associated with the user of the vehicle and/or one or more vehicle maintenance service providers pre-registered and preferred by the user. The second set of data may further comprise a rating associated with the maintenance service provider. The second set of data may further comprise a set of pre-defined permissions to modify operational parameters of the first set of electronic devices associated with one or more of the set of cloud-based services 106. Examples of the operational parameters of the first set of electronic devices may include, but are not limited to, operational state of electronic devices, ambient conditions of the electronic devices, and/or one or more user-defined preferences associated with the electronic devices. In accordance with an embodiment, the first set of electronic devices may transmit the second set of data to the central database 104 and/or the plurality of local databases 110 (such as the local databases 110*a* and 110*b*), via the communication network 112.

In accordance with an embodiment, the server 102 may be configured to retrieve the first set and/or the second set of data from the central database 104. In accordance with an embodiment, the server 102 may be configured to retrieve the first set and/or the second set of data (associated with the automotive service 106*a* and the home automation service 106*b*) from the local databases 110*a* and 110*b*, respectively. In accordance with an embodiment, the server 102 may be further configured to extract information and learn from the received first set and/or the second set of data. The extraction and learning may be based on the pattern analysis of the received first set and/or the second set of data and adaptive learning there from. Such extraction and learning of the information from the first set and/or the second set of data may further correspond to related data intelligence (RDI) of the server 102. The RDI may further facilitate the server 102 to establish a relationship of the intelligence derived from the extracted and learned information with one or more real-time services provided by the set of cloud-based services 106.

In accordance with an embodiment, based on the extraction and learning of the information and RDI derived from the first set and/or the second set of data, the server 102 may be configured to determine one or more responses that correspond to the detected event. The server 102 may be further configured to transmit the determined one or more responses to one or more other client systems, such as the client system 108*b*, associated with the home automation service 106*b*, via the communication network 112.

In accordance with an embodiment, the server 102 may be configured to determine one or more control instructions based on the determined one or more responses. The determined one or more control instructions may be transmitted to the one or more other client systems, such as the client system 108*b*, via the communication network 112. The client system 108*b* may be configured to control the second set of electronic devices associated with the home automation service 106b based on the one or more control instructions. Notwithstanding, the disclosure may not be so limited, and the server 102 may be configured to transmit the determined one or more responses to the client system 108b that may be configured to generate one or more control instructions based on the one or more responses, without departure from the scope of the disclosure.

In accordance with an embodiment, the client system 108a may comprise one or more application program interfaces (APIs) that may be triggered based on the received one or more responses from the server 102. The triggered one or more APIs may comprise a first API that may generate recommendations by use of one or more advisory applications, based on the one or more responses received by the client system 108a. In accordance with an embodiment, the generated one or more recommendations may be rendered on a personalized UI presented at the first set of electronic devices, based on a second API. Based on the one or more recommendations rendered on the personalized UI, one or more operational parameters associated with the first set of electronic devices may be modified.

In accordance with an embodiment, the server 102 may be configured to generate one or more recommendations and bypass the client system 108a to transmit the generated one or more recommendations directly to the ECU of the vehicle, via the communication network 112. The ECU of the vehicle may be configured to render the received one or more recommendations to the user, via an audio interface of a speaker system and/or a visual interface at a personalized UI. Based on the rendered one or more responses and/or the generated one or more recommendations, the user may issue one or more commands to modify the one or more operational parameters associated with the first set of electronic devices. The issued one or more commands may be transmitted to the home automation service 106b, via the communication network 112.

In accordance with an embodiment, the client system 108b may be configured to control the first set of electronic devices associated with the home automation service 106b, based on triggering of one or more APIs installed at the client system 108b. The triggered one or more APIs may comprise a third API at the client system 108b that may perform one or more actions, based on the determined one or more responses and/or the determined one or more control instructions, received by the client system 108b. The generated one or more control instructions may comprise a control instruction to postpone the change of operational state of the first set of electronic devices, such as switching of an air conditioner (AC) from an OFF state to an ON state, based on the breakdown of the vehicle. The generated one or more control instructions may be based on user information that may be associated with the user of the vehicle and/or the first set of electronic devices. The user information may include a set of pre-defined permissions to modify operational parameters of the first set of electronic devices associated with the home automation service 106b. The user information may further include a set of pre-stored user preferences, such as a desired temperature setting of the AC. The user information may further include an input provided by the user, such as a temperature setting, at which the AC should be set when switched ON. The pre-stored user preferences may further include a preferred merchant that provides vehicle maintenance services to the user, based on the associated rank of the merchant. In accordance with an embodiment, the user information may be provided in real time by the user, based on the one or more responses transmitted to the ECU of the vehicle. Such real-time information may be generated by use of the ECU of the vehicle.

In accordance with an exemplary scenario, the event may correspond to reception of a request from the user associated with the client system 108d to determine optimal time to travel to a location. In such a case, the server 102 may be configured to retrieve a second set of data that corresponds to a traffic pattern of a route to the location that corresponds to the user preference associated with the automotive service 106a. Such a traffic pattern may also be retrieved from the first set of electronic devices associated with one or more vehicles associated with the automotive service 106a. In accordance with an embodiment, the traffic pattern may also be retrieved from the local database 110a, associated with the automotive service 106a. Based on the pattern analysis of the first set and/or the second set of data, the server 102 may be configured to generate one or more responses that correspond to the occurred event. For instance, the generated one or more responses may correspond to an optimal time to travel to a destination and best route to follow to reach the destination, based on the pattern analysis of the first set of data that may comprise a preferred time to travel to the location to avoid traffic.

In accordance with an embodiment, the server 102 may be configured to transmit the generated one or more responses to the second set of electronic devices associated with the set of cloud-based services 106, via the communication network 112. For example, based on the determined optimal time to travel, the server 102 may be configured to transmit one or more responses to the ERP service 106d. The transmitted one or more responses may comprise the optimal time to travel and/or an expected time of arrival of the user at the destination, such as the office. Based on the received one or more responses, the ERP service 106d may be configured to schedule and/or cancel one or more meetings of the user. The ERP service 106d may further generate one or more notifications by use of the second set of electronic devices associated with the ERP service 106d. The generated one or more notifications may comprise a schedule of the meeting that may be transmitted to one or more other users, via the communication network 112. In accordance with an embodiment, a leave management service, in conjunction with the ERP service 106d, may generate one or more notifications about availability of the user if a meeting is being scheduled without the user's notice.

In accordance with an embodiment, the server 102 may be configured to transmit the generated one or more responses to the client system 108d, via the communication network 112. The client system 108d may comprise one or more application program interfaces (APIs) that may be triggered based on the received one or more responses. The triggered one or more APIs may comprise a first API that may generate recommendations by use of one or more advisory applications, based on the one or more responses received by the client system 108d. For example, if the user had a pre-scheduled meeting in Outlook®, the one or more advisory applications may generate recommendations about newly planned route and/or provide update about climatic conditions. Further, if the user is expected to arrive late for the pre-scheduled meeting, the one or more advisory applications may update the current status, such as location, to the other members of the meeting based on the user's permission.

In accordance with an embodiment, the server 102 may be further configured to customize the generated one or more responses, based on the first set of data and/or the aforementioned information. For example, when the first set of data includes a preferred mode of transit, such as a car or a train, to the destination, the server 102 may be configured to determine the optimal time to travel that corresponds to the preferred mode of transit.

In accordance with another exemplary scenario, the event may correspond to reception of a request to determine a location of the user, from the one or more other users associated with the client system 108b of the home automation service 106b. Such one or more other users may be associated with the user, via a social network. The server 102 may be configured to determine the first set of data that includes the one or more GPS locations of the user. The first set of data may further comprise the set of pre-stored user preferences associated with the user. Based on the first set of data, the server 102 may be configured to determine the location (which may comprise one or more responses) of the vehicle of the user. The location may be determined based on an exchange of vehicle-to-vehicle (V2V) connectivity data (which may be the second set of data) of the vehicle with one or more other vehicles present in the proximity of the vehicle. In accordance with an embodiment, the server 102 may be configured to determine the location of the user, based on one or more previous locations of the user stored in the local database 110a of the automotive service 106a.

In accordance with an embodiment, it may be determined by the server 102 the user has enabled an option to allow the one or more other users to track the GPS location. In such a case, the server 102 may be configured to transmit one or more responses that comprise the determined location of the vehicle of the user to the client system 108b associated with the home automation service 106b. The second API at the client system 108b may be configured to render the received location of the user on the personalized user interface (UI) present on the first set of electronic devices.

In accordance with an embodiment, it may be determined by the server 102 the user has disabled the option to allow the one or more other users to track the GPS location. In such a case, the server 102 may be configured to generate one or more recommendations for the one or more other users of the client system 108b, based on one or more APIs stored in the central database 104. Such generated one or more recommendations may correspond to a notification to inform the one or more other users that the GPS location of the user could not be determined.

In accordance with another exemplary scenario, one or more health parameters of a user, such as a driver, of a vehicle may be sensed by one or more wearable electronic devices worn by the driver of the vehicle. Such health parameters may include, but are not limited to, mood, a pulse rate, a mood indicator, a heart rate, blood pressure (BP), and/or body temperature. The one or more health parameters may be considered as the first set of data from the first set of electronic devices, such as the one or more wearable electronic devices, at the client system 108a of the automotive service 106a, via the communication network 112. Further, one or more vehicle parameters may be sensed by the first set of electronic devices installed within the vehicle. Such vehicle parameters may include, but are not limited to, speed, acceleration, deceleration, change of lanes, and/or activation of turn indicators of the vehicle.

In accordance with an embodiment, the event may correspond to a change in one or more health parameters of the driver and/or one or more vehicle parameters of the vehicle. In an instance, the event may be detected when the speed of the vehicle exceeds a pre-defined safety limit. In such a case, the first set of data may correspond to the one or more vehicle parameters. The server 102 may analyze the received one or more health parameters, one or more vehicle parameters, and/or the set of pre-stored user preferences. The server 102 may be further configured to retrieve one or more settings, such as preferred climate control settings of the vehicle and/or preferred audio playlist of the driver, stored in the local database, such as the local database 110a. Based on the pattern analysis of the received one or more health parameters, the one or more settings, the one or more vehicle parameters, and/or the set of pre-stored user preferences, the server 102 may be configured to determine one or more responses.

In accordance with an embodiment, the server 102 may be configured to determine one or more recommendations from the responses, and transmit the one or more recommendations to the client system 108a. Based on the generated one or more recommendations, the client system 108a may change the environment settings and adjustment of lighting of the vehicle. In an instance, the client system 108a may be configured to unify data sync from multiple data sources, extract a favorite list of the driver, and play music accordingly. The client system 108a may be further configured to facilitate the vehicle to automatically adapt the driving profile of the driver based on the unified data sync from multiple data sources.

In accordance with an embodiment, the server 102 may be configured to transmit the determined one or more responses to the client system 108b, via the communication network 112. The client system 108b may be configured to generate one or more control instructions based on the received one or more responses. Additionally, the client system 108b may adjust the HAN environment and caution family members at home about the event, via a short message service (SMS) or an emergency alarm.

In accordance with an embodiment, the client systems 108a and/or 108b may store the received one or more recommendations and/or responses that correspond to the received one or more health parameters and/or one or more vehicle parameters, in the central database 104 or in the local database 110a. Such storage of the determined one or more recommendations and/or responses may be performed to reduce the turnaround time in case one or more similar health parameters and/or vehicle parameters are received by the client systems 108a and/or 108b in future.

In accordance with another exemplary scenario, the first set of data may correspond to utility bills associated with the power consumption at a facility of the user. Such a first set of data may be periodically received by the server 102, for example at the end of a billing cycle, from the client system 108b of the home automation service 106b. Further, the server 102 may be configured to retrieve the second set of data, such as the price of power per unit and/or a set of pre-stored user preferences, from the local database 110b. Based on the pattern analysis of the received first set and/or the second set of data, the server 102 may be configured to determine one or more responses. The server 102 may be further configured to transmit the determined one or more responses to the client system 108b, via the communication network 112. The client system 108a may be configured to generate one or more recommendations and/or one or more control instructions, based on the received one or more responses, via one or more APIs. Such one or more recommendations may correspond to a usage plan to reduce the net cost of utility bills. The one or more control instructions may correspond to control of usage of one or more electrical appliances and/or electronic devices associated with the home automation service 106b, to reduce the net cost of utility bills. Based on the generated one or more recommendations and/or one or more control instructions, the usage pattern of the one or more electrical appliances and/or electronic devices may be controlled.

In accordance with another exemplary scenario, the client system 108b of the home automation service 106b may be configured to monitor the operational status of the first set of electronic devices connected to the home automation service 106b. In instances when an emergency instance and/or a fault are detected in the first set of electronic devices, a first set of data may be transmitted to the server 102, via the communication network 112. The server 102 may be configured to retrieve the second set of data from the local database 110b. The second set of data may further comprise standard operational parameters associated with the first set of electronic devices. Based on the pattern analysis of the received first set and/or the second set of data, the server 102 may be configured to determine one or more responses, such as cut-off of power supply to the first set of electronic devices. The server 102 may be further configured to transmit the determined one or more responses to the client system 108b, via the communication network 112. In accordance with an embodiment, the client system 108a may be configured to generate one or more recommendations and/or one or more control instructions based on the received one or more responses. Such one or more recommendations may correspond to one or more steps to mitigate the detected emergency instance and/or repair the fault.

In accordance with an embodiment, the one or more steps may comprise creation of a maintenance ticket that corresponds to the detected fault and tracking of the created ticket until the fault is resolved. In accordance with an embodiment, the one or more steps may comprise generation of an alarm to notify the occurrence of the fault to the user. Such a generated alarm may be rendered to the user, via an audio and/or visual interface. Further, the server 102 may be configured to track the generated alarm based on the detected fault. The server 102 may be further configured to render information that corresponds to the tracked alarm. In accordance with an embodiment, the client system 108b may be configured to perform one or more actions based on the received one or more responses, generated one or more control instructions, and/or pre-defined permissions. Such one or more actions may comprise automatic cut-off of the power supply to the first set of electronic devices in case of the detected emergency instance.

In accordance with another exemplary scenario, the client system 108b of the home automation service 106b may be configured to monitor the operational status of one or more electrical appliances connected to the home automation service 106b. Such electrical appliances may correspond to solar-energy-based appliances, such as a solar power system. For instance, the first set of data corresponds to a gain associated with the power generated by the solar power system. In such an instance, the server 102 may be configured to retrieve second set of data from the local database 110b or the central database 104. The second set of data may comprise azimuth tracking information of the sun. The second set of data may further comprise weather information associated with a location where the solar power system may be placed. Based on the pattern analysis of the received first set and/or the second set of data, the server 102 may be configured to determine one or more responses, such as adjustment of the angle of a solar panel of the solar-power device, based on the azimuth tracking information of the sun. The server 102 may be further configured to transmit the determined one or more responses to the client system 108b, via the communication network 112.

In accordance with an embodiment, the client system 108b may be configured to generate one or more recommendations and/or one or more control instructions based on the received one or more responses. Such one or more recommendations may correspond to one or more steps to maximize the gain of the power generated by the solar power system. The recommendations may correspond to instruction for the user to periodically adjust the direction of the solar panel, based on the azimuth tracking of the sun. In accordance with an embodiment, the client system 108b may be configured to perform one or more actions that correspond to automatic adjustment of the direction of the solar panel, based on the azimuth of the sun. Such one or more actions may further comprise automatic cut-off of the power supply to the solar power system in case the weather forecast predicts overcast and/or rainy conditions.

In accordance with another exemplary scenario, the client system 108c of the health-care service 106c may be configured to monitor one or more parameters associated with the health of a patient. The health of the patient may be monitored based on the one or more parameters measured by the first set of electronic devices associated with the health-care service 106c. Examples of the monitored parameters may include, but are not limited to, heartbeat, pulse, body temperature, weight of the patient, body mass index (BMI), and/or blood pressure (BP). The client system 108c may be further configured to transmit the measured one or more parameters as the first set of data to the server 102, when the value of at least one of the measured parameters is indicative of an anomaly in the health of the patient.

The server 102 may be configured to retrieve one or more parameters stored in the local database 110c as the second set of data. The retrieved one or more parameters may correspond to standard parameters associated with a healthy individual. The retrieved one or more parameters may further comprise medical history of the patient and/or one or more other patients with similar ailment. An emergency instance may be detected based on the comparison of the one or more parameters received from the client system 108c and the local database 110c. Based on the pattern analysis of the received first set and/or the second set of data, the server 102 may be configured to determine one or more responses, such as a medical procedure to normalize the health condition of the patient. In an instance, the server 102 may be configured to predict an occurrence of a medical emergency for a patient, based on the aforementioned analysis. Such a prediction of the medical emergency may be based on a machine learning algorithm, retrieved from a local memory.

In accordance with an embodiment, the server 102 may be configured to transmit the determined one or more responses to second set of electronic devices, such as doctors, via the communication network 112. In the aforementioned scenario, the determined one or more responses may correspond to one or more recommendations. Such one or more recommendations may include, but are not limited to, updates on development in medicines, updates on development in medical technology, updates on surgical procedures, and/or enhancements in a field-of-interest of a user, For the sake of brevity, the aforementioned application of the disclosed invention is explained for a single instance of a patient. However, a person with ordinary skill in the art will understand that the aforementioned determination of the one or more responses may be based on the pattern analysis of the first set and/or the second set of data associated with a plurality of patients.

In accordance with an embodiment, the server 102 may be configured to transmit the determined one or more responses to the client system 108c. The client system 108c may be configured to generate one or more recommendations and/or control instructions based on the received one or more responses. The generated one or more recommendations may include, but are not limited to, a relevant first-aid, and administration of one or more medicines to mitigate the emergency health condition. The generated one or more control instructions may include, but are not limited to, generation of an medical alert for doctors, informing a pharmacy about the medicine requirements of a patient, and/or booking an ambulance based by use of an advisory application associated with the health-care service 106c.

In accordance with another exemplary scenario, the client system 108e of the infrastructure-based service 106e may be configured to monitor one or more parameters associated with the infrastructure facilities in a building. The infrastructure facilities may include, but are not limited to, an elevator, a parking facility, fire-extinguishers, one or more network equipment such as printers, vending machines, electrical appliances, and/or one or more sensors, such as a smoke detector. The client system 108e may be configured to monitor the availability of one or more facilities of the building. The client system 108e may be configured to transmit the one or more parameters that correspond to the availability of the one or more facilities to the server 102, as first set of data, via the communication network 112. In accordance with an embodiment, the one or more parameters may be stored in the local database 110e. The transmission of the one or more parameters to the server 102 may be based on the detection of an event by the client system 108e. Examples of such an event may include, but are not limited to, a status request of the availability of the infrastructure facilities provided by a user, an emergency situation (such as a fire hazard and/or an earthquake), and/or a request for a parking space provided by the user.

In accordance with an embodiment, the server 102 may be configured to receive the one or more parameters as the first set of data. The server 102 may be further configured to retrieve the second set of data that may comprise information, such as floor plan of the building, from the central database 104. The second set of data may further include a location of a user, details of a vehicle of the user, and/or the like. Based on the pattern analysis of the received first set and/or the second set of data, the server 102 may be configured to determine one or more responses, such as an availability of a nearest fire extinguisher with respect to a location of the user, in case of fire. The one or more responses may further correspond to availability of a nearest vacant parking space with respect to the location of the user.

In accordance with an embodiment, the one or more responses may correspond to a real-time availability of elevators in the building. For instance, the one or more responses may correspond to an emergency evacuation procedure and/or an evacuation plan that comprises a map. Further, the one or more responses may correspond to operational status of network equipment and/or electrical appliances within the vicinity of the location of the user. In accordance with an embodiment, the server 102 may be configured to retrieve the first set of data from the local database 110e, based on reception of event information from the client system 108e.

In accordance with an embodiment, the server 102 may be configured to generate one or more control instructions, based on the determined one or more responses. The generated one or more control instructions may include, but are not limited to, booking of the determined vacant parking space for the user based on a first-come first serve (FIFA) algorithm, notifying emergency response services such as fire-brigade in case of an emergency, and/or providing live update of infrastructure facilities to the user.

In accordance with another exemplary scenario, the client system 108f of the miscellaneous services 106f may be configured to monitor one or more parameters associated with a personalized account of the user. The personalized account may include a bank account, a stock market portfolio, an account on a social network platform, and/or the like. The client system 108f may be configured to monitor transaction patterns that correspond to the personalized account of the user. Based on the monitoring of the transaction pattern, a first set of data may be determined by the client system 108f. The determined first set of data may be transmitted to the server 102. In accordance with an embodiment, the determined first set of data may be stored in the local database 110f.

In accordance with an embodiment, the server 102 may be configured to determine a second set of data associated with the user. The second set of data may be retrieved from the central database 104. The second set of data may include details of a bank to which the user is associated, stock updates that correspond to the stocks associated with the portfolio of the user, anniversary dates associated with the user, and one or more other users associated with the user, and/or the like.

Based on the pattern analysis of the received first set and/or the second set of data, the server 102 may be configured to determine one or more responses, such as a reminder of one or more dates for payment of credit card bills associated with the bank. The one or more responses may further include provision of stock market updates to the user, based on an analysis of stock market index. In accordance with an embodiment, the one or more responses may be transmitted to the client system 108f. Based on the received one or more responses, the client system 108f may be configured to generate one or more control instructions. The generated one or more control instructions may be further based on the first set of data that includes a set of pre-defined permissions to perform one or more actions associated with an account of the user. The one or more actions may include, but are not limited to, payment of the credit card bill, transaction of stock market, purchase of a gift item for one or more other users based on the anniversary date, and/or dispatch of the purchased gift to an address of the one or more other users.

FIGS. 2A, 2B, and 2C are block diagrams that illustrates various exemplary components and systems of a server and a client system, and a vehicle, respectively, in a unified connected network, in accordance with an embodiment of the disclosure. With reference to FIG. 2A, there is shown a block diagram that illustrates various exemplary components and systems of the server 102 in the unified connected network, in accordance with an embodiment of the disclosure. FIG. 2A is explained in conjunction with elements from FIG. 1. With reference to FIG. 2A, there is shown the server 102 that may comprise a processor 202. The processor 202 may include the central database 104. The server 102 may further comprise a related data intelligence (RDI) unit 204, an advisory application unit 206, a command control unit 208, and/or a transceiver 210. A person with ordinary skill in the art will appreciate that the central database 104 may be a remote database that may be external to the server 102 (as explained in FIG. 1), without departure from the scope of the disclosure.

The processor 202 may be communicatively coupled to the RDI unit 204, the advisory application unit 206, the command control unit 208, and/or the transceiver 210. In accordance with an embodiment, the server 102 may be communicatively coupled to the plurality of client systems 108, such as the client systems 108a to 108f, via the transceiver 210, as explained in FIG. 1. It should be understood that the server 102 may also include other suitable components and systems, but for the sake of brevity, those components and systems which are used to describe and explain the function and operation of the present disclosure are illustrated herein.

The processor 202 may comprise suitable logic, circuitry, interfaces, and/or code that may be configured to process a first set of data and a second set of data. The first set of data may correspond to a service of the set of cloud-based services 106 and the second set of data may correspond to one or more other services of the set of cloud-based services 106, associated with the user. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a graphics processing unit (GPU), a state machine, and/or other processors or circuits.

The RDI unit 204 may comprise suitable logic, circuitry, interfaces, and/or code that may be configured to perform pattern analysis of the first set and/or the second set of data. Based on the pattern analysis, the RDI unit 204 may be further configured to extract intelligent information from the first set and/or the second set of data. The extraction and learning of the information from the first set and/or the second set of data may be based on pattern analysis of the received first set and/or the second set of data and adaptive learning there from. Such extraction and learning of the information from the first set and/or the second set of data may further correspond to related data intelligence (RDI) of the server 102. The RDI unit 204 may further facilitate the server 102 to establish a relationship of the intelligence derived from the extracted and learned information with one or more real-time services provided by the set of cloud-based services 106. The RDI unit 204 may be further configured to transmit the extracted information to the advisory application unit 206, the command control unit 208. The RDI unit 204 may be further configured to extract and learn intelligent information from the received first and/or second set of data, based on one or more of a pattern analysis algorithm, an adaptive algorithm, and/or a machine learning algorithm retrieved from the central database 104. The RDI unit 204 may be implemented based on several technologies that are well known to those skilled in the art.

The advisory application unit 206 may comprise suitable logic, circuitry, interfaces, and/or code that may be configured to determine one or more responses, based on the extracted and learned information from the pattern analysis of the first set and/or the second set of data. The advisory application unit 206 may be further configured to generate one or more recommendations and/or one or more control instructions, based on the determined one or more responses. The determined one or more responses, the generated one or more recommendations and/or one or more control instructions, may be communicated to the command control unit 208. The advisory application unit 206 may be implemented based on several technologies that are well known to those skilled in the art.

The command control unit 208 may comprise suitable logic, circuitry, interfaces, and/or code that may be configured to generate one or more control instructions. The one or more control instructions may be based on received one or more responses, one or more recommendations, and/or one or more control instructions. The command control unit 208 may be further configured to communicate the generated one or more control instructions to a local command control unit of one or more client systems, such as the client systems 108a to 108f. The command control unit 208 may be implemented, based on several technologies that are well known to those skilled in the art.

The transceiver 210 may comprise suitable logic, circuitry, interfaces, and/or code that may be configured to communicate with the plurality of client systems 108, such as the client systems 108a to 108f, via the communication network 112. The transceiver 210 may implement known technologies to support wired or wireless communication of the server 102 with the communication network 112. The transceiver 210 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the processor 202 may be configured to receive a first set of data that corresponds to a service of the set of cloud-based services 106 from one or more of the plurality of client devices 108, via the transceiver 210. In accordance with an embodiment, the service may correspond to the automotive service 106a, the home automation service 106b, the health-care service 106c, the ERP service 106d, the infrastructure-based service 106e, and/or the miscellaneous services 106f (as explained in FIG. 1). The reception of the first set of data may be based on an occurrence of an event associated with the first set of electronic devices, such as an ECU, associated with one or more services of the set of cloud-based services 106. In accordance with an example, such an event may correspond to a breakdown of the vehicle of a user. In accordance with another example, the event may correspond to reception of a request to determine optimal time to travel to a location, from a user associated with the vehicle. In accordance with yet another example, the event may further correspond to reception of a request from one or more other users, to determine a location of the user.

In accordance with an embodiment, based on the detection of the event, such as the vehicle breakdown, processor 202 may be configured to receive the first set of data from the one or more of the plurality of client systems, such as the client system 108a, associated with the automotive service 106a. The first set of data may be based on data received from one or more sensors associated with the first set of electronic devices. The received first set of data may correspond to one or more of a preferred time to travel to a destination, Global Positioning Satellite (GPS) coordinates of a vehicle, one or more motion and/or vehicle parameters of the vehicle, and/or set of pre-stored user preferences associated with the user. In accordance with an embodiment, the first set of data may be provided by the user, for example, via the ECU of the vehicle. The one or more of the plurality of client systems 108 may be configured to store the received first set of data in the corresponding database of the plurality of local databases 110.

In accordance with an embodiment, the processor 202 may be configured to retrieve a second set of data from various data sources, such as the central database 104, the plurality of local databases 110, and/or one or more services of the set of cloud-based services 106, such as the home automation service 106b, associated with the first set of electronic devices, as described in FIG. 1. The second set of data may further correspond to one or more operating parameters of the first set of electronic devices. The second set of data may further comprise a set of pre-defined permissions to modify operational parameters of the first set of electronic devices associated with one or more of the set of cloud-based services 106. The one or more operational parameters may include, but are not limited to, the operational state of electronic devices, ambient conditions of the electronic devices, and/or one or more user-defined preferences associated with the electronic devices. Notwithstanding, the disclosure may not be so limited, and the second set of data may be stored at the plurality of local databases 110 associated with corresponding service from the set of cloud-based services 106, without departure from the scope of the disclosure.

In accordance with an embodiment, the processor 202 may be configured to communicate the received first set of data and/or the received second set of data to the RDI unit 204. The RDI unit 204 may be configured to retrieve pattern analysis algorithms, adaptive algorithms, and/or machine learning algorithms from the central database 104. Based on the retrieved algorithms, the RDI unit 204 may be configured to extract intelligent information from the received first set and/or the second set of data. The extraction of the intelligent information from the first set and/or the second set of data may be based on the pattern analysis of the received first set and/or the second set of data. The extraction of intelligent information may be further based on a decision tree learning, an association rule learning, artificial neural networks, inductive logic programming, cluster analysis, reinforcement learning, similarity and metric learning, support vector machine (SVM), relevance vector machine (RVM), and/or the like.

In accordance with an embodiment, the RDI unit 204 may be configured to communicate the extracted information to the advisory application unit 206, via the transceiver 210. Based on received extracted information, the advisory application unit 206 may be configured to determine one or more responses. Notwithstanding, the disclosure may not be so limited, and the advisory application unit 206 may be configured to transmit the determined one or more responses to one or more of the plurality of client systems 108, which may be configured to generate one or more control instructions based on the one or more responses, without departure from the scope of the disclosure.

In accordance with an embodiment, the advisory application unit 206 may comprise one or more application program interfaces (API) that may be triggered based on the determined one or more responses. The triggered one or more APIs may comprise a first API that may generate recommendations by use of one or more advisory applications, based on the one or more responses received from the one or more of the plurality of client systems 108. In accordance with an embodiment, the generated one or more recommendations may be rendered on a personalized UI present at the first set of electronic devices, based on a second API. Based on the rendered one or more recommendations on the personalized UI, another user may modify one or more operational parameters associated with the first set of electronic devices.

In accordance with an embodiment, the advisory application unit 206 may be configured to bypass the plurality of client systems 108, to transmit the determined one or more responses to the first set of vehicles. Based on the received one or more responses, the first set of vehicles may be configured to render the received one or more responses and/or generated one or more recommendations to the user, via an audio interface and/or a visual interface. Based on the rendered one or more responses, the user may issue one or more commands to modify the one or more operational parameters associated with the first set of electronic devices.

In accordance with an embodiment, the advisory application unit 206 may be configured to transmit the determined one or more responses and/or generated one or more recommendations, directly to the command control unit 208, via the communication network 112. In accordance with an embodiment, the command control unit 208 may be configured to generate one or more control instructions. The command control unit 208 may be further configured to transmit the generated one or more control instructions to the second set of electronic devices associated with the plurality of client systems 108. Based on the generated one or more control instructions, the command control unit 208 may be configured to directly control the second set of electronic devices associated with one or more of the set of cloud-based services 106.

In accordance with an embodiment, the operation of the first set of electronic devices associated with the corresponding service from the set of cloud-based services 106 may be controlled based on one or more APIs installed at the command control unit 208. The one or more APIs may be triggered based on the generated one or more control instructions. The triggered one or more APIs may comprise a third API that may perform one or more actions, based on the determined one or more responses and/or the determined one or more control instructions, received by the one or more of the plurality of client systems 108. The performed one or more actions may comprise postponement of the change of operational state of the second set of electronic devices, such switching of the AC from an OFF state to an ON state, based on the breakdown of the vehicle. The performed one or more actions may be based on user information that may be associated with the user of the vehicle and/or the first set of electronic devices.

The user information may include a set of pre-defined permissions to modify operational parameters of the first set of electronic devices associated with the one or more of the set of cloud-based services 106. The user information may further include a set of pre-stored user preferences, such as a desired temperature preference associated with the AC that corresponds to the user. The user information may further include an input provided by the user, such as a temperature setting at which to switch ON the AC. The preference may further include a preferred merchant that provides vehicle maintenance services to the user. In accordance with an embodiment, the aforementioned information may be provided in real time the user, based on the transmitted one or more responses to the vehicle. Such real-time information may be generated by use of the ECU of the vehicle.

In accordance with an embodiment, the processor 202 may be configured to customize the generated one or more responses based on the first set of data and/or the aforementioned information. For example, when the first set of data may include a mood index of a user, the processor 202 may be configured to determine one or more responses that may correspond to the set of pre-stored user preferences of the user. Such a determination of one or more responses, such as playing preferred songs from a playlist of the user, may be customized based on the detection of an identity of the user driving the vehicle.

With reference to FIG. 2B, there is shown a block diagram that illustrates various exemplary components and systems of an instance of a client system of the plurality of client systems 108 in the unified connected network, in accordance with an embodiment of the disclosure. FIG. 2B is explained in conjunction with elements from FIGS. 1 and 2A. With reference to FIG. 2B, there is shown a client system 212 that may comprise a processor 214. The client system 212 may include a processor 214, a local database 216, a local advisory application unit 218, a resource handling unit 220, a local command control unit 222, and/or a transceiver 224. The processor 214 may be communicatively coupled to the local database 216, the local advisory application unit 218, the resource handling unit 220, the local command control unit 222, via the transceiver 224.

A person with ordinary skill in the art will appreciate that the local database 216 may be a remote database that may be external to the client system 212, without departure from the scope of the disclosure. A person with ordinary skill in the art will further appreciate that the functionality and components of the client system 212 may be similar to that of the plurality of client systems 108. A person with ordinary skill in the art will further appreciate that the functionality and components of the local database 216 may be similar to that of the plurality of local databases 110. It should be understood that the client system 212 may also include other suitable components and systems, but for the sake of brevity, those components and systems which are used to describe and explain the function and operation of the present disclosure are illustrated herein.

The processor 214 may comprise suitable logic, circuitry, interfaces, and/or code that may be configured to receive one or more responses from the server 102. The processor 202 may be implemented, based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a graphics processing unit (GPU), a state machine, and/or other processors or circuits.

The local advisory application unit 218 may comprise suitable logic, circuitry, interfaces, and/or code that may comprise one or more advisory applications to generate one or more recommendations. The generated one or more recommendations may be based on the one or more responses received from the server 102. Based on the one or more advisory applications, the local advisory application unit 218 may be configured to render the generated one or more recommendations on a personalized UI present at the first set of electronic devices. The local advisory application unit 218 may be implemented based on several technologies that are well known to those skilled in the art.

The resource handling unit 220 may comprise suitable logic, circuitry, interfaces, and/or code that may be configured to manage the allocation of resources associated with the client system 212. Such resources may correspond to the first set of electronic devices associated with the set of cloud-based services 106. The status of the availability of the resources may be stored in respective local databases 110, associated with the client system 212. The resource handling unit 220 may be implemented, based on several technologies that are well known to those skilled in the art.

The local command control unit 222 may comprise suitable logic, circuitry, interfaces, and/or code that may be configured to generate one or more control instructions based on the received one or more responses. One or more actions may be performed at a second set of electronic devices, based on the generated one or more control instructions. The local command control unit 222 may be implemented, based on several technologies that are well known to those skilled in the art.

The transceiver 224 may comprise suitable logic, circuitry, interfaces, and/or code that may be configured to communicate with the server 102, via the communication network 112. The transceiver 224 may implement known technologies to support wired or wireless communication of the server 102 with the communication network 112. The transceiver 224 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 224 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the processor 214 may be configured to receive one or more responses from the server 102, via the transceiver 224. Such received one or more responses may be based on extraction and learning of intelligent information performed by the processor 202 in conjunction with the RDI unit 204, based on the pattern analysis of the first set of data and the second set of data. Based on the received one or more responses, the local advisory application unit 218 may be configured to retrieve one or more APIs from the local databases 110.

In accordance with an embodiment, the retrieved one or more APIs may correspond to a first API, a second API, and/or a third API. The local advisory application unit 218 may be configured to generate one or more recommendations based on the first API. The generated one or more recommendations may be rendered on the first set of electronic devices associated with the set of cloud-based services, based on the second API. The second API of the local advisory application unit 218 may be further configured to customize the generated one or more recommendations, based on the set of pre-stored user preferences that may be a part of the second set of data. The customized one or more recommendations may be rendered on a personalized UI, at the first set of electronic devices. The third API of the local advisory application unit 218 may be configured to perform one or more actions, based on the determined one or more responses and/or the determined one or more control instructions, received by the client system 212.

In accordance with an embodiment, the local advisory application unit 218 may be configured to transmit the generated one or more recommendations to the first set of electronic devices, via the transceiver 224. In accordance with an embodiment, the local advisory application unit 218 may be configured to communicate the generated one or more recommendations to the local command control unit 222, via the transceiver 224. The local command control unit 222 may be configured to generate one or more control instructions to render the received one or more recommendations on the first set of electronic devices associated with the set of cloud-based services 106.

In accordance with an embodiment, based on the one or more responses, the resource handling unit 220 may be configured to determine the availability status of the one or more resources of the client system 212. Such resources may correspond to the first set of electronic devices associated with the set of cloud-based services 106. The resource handling unit 220 may be configured to retrieve the availability status of the one or more resources from the local databases 110, associated with the set of cloud-based services 106. Based on the retrieved status, the resource handling unit 220 may be further configured to allocate one or more available resources to the processor 214.

In accordance with an embodiment, based on the allocated one or more available resources, the processor 214 may be configured to communicate the availability status of the one or more resources and/or received one or more responses to the local command control unit 222. The local command control unit 222 may be configured to generate one or more control instructions that correspond to the available one or more resources. For example, when the received one or more responses correspond to determination of a GPS location of a vehicle, the local command control unit 222 may be configured to control ECUs of one or more vehicles in the vicinity of the vehicle (one or more available resources) to retrieve the GPS location of the vehicle, via a V2V communication. The processor 214 may be further configured to perform one or more actions on the second set of electronic devices, based on the determined one or more control instructions issued by the local command control unit 222, via the third API.

FIG. 2C is a block diagram that illustrates various exemplary components or systems of a vehicle, in accordance with an embodiment of the disclosure. FIG. 2 is explained in conjunction with elements from FIGS. 1, 2A and 1B. With reference to FIG. 2C, there is shown a vehicle 226. The vehicle 226 may comprise an ECU 228 that may include a microprocessor 230 and a memory 232. The vehicle 226 may further comprise a wireless communication system 234, an audio interface 236, a display 238, a powertrain control system 240, a steering system 242, a braking system 244, a sensing system 246, a body control module 248, and an in-vehicle network 250. There is further shown a battery 252 associated with a vehicle power system 254. In accordance with an embodiment, the wireless communication system 234, and the audio interface 236 may also be associated with the ECU 228. The display 238 may render a user interface (UI) 208*a*. The vehicle 226 may further include a client system 256, similar to the client system 212 as described in detail in FIG. 2B.

The various components or systems may be communicatively coupled to each other, via the in-vehicle network 250, such as a vehicle area network (VAN), and/or an in-vehicle data bus. The microprocessor 230 may be communicatively coupled to the memory 232, the wireless communication system 234, the audio interface 236, the display 238, and the sensing system 246, via the in-vehicle network 250. In accordance with an embodiment, the microprocessor 230 may be operatively connected to the powertrain control system 240 and the body control module 248. It should be understood that the vehicle 226 may also include other suitable components or systems, but for brevity, those components or systems which are used to describe and explain the function and operation of the present disclosure are illustrated herein.

The microprocessor 230 may comprise suitable logic, circuitry, interfaces, and/or code that may be configured to execute a set of instructions stored in the memory 232. Examples of the microprocessor 230 may be an X86-based processor, a Reduced Instruction Set Computing (RISC) processor, an Application-Specific Integrated Circuit (ASIC) processor, a Complex Instruction Set Computing (CISC) processor, an Explicitly Parallel Instruction Computing (EPIC) processor, a Very Long Instruction Word (VLIW) processor, a microcontroller, a central processing unit (CPU), a graphics processing unit (GPU), a state machine, and/or other processors or circuits.

The memory 232 may comprise suitable logic, circuitry, and/or interfaces that may be configured to store a machine code and/or a set of instructions executable by the microprocessor 230. Examples of implementation of the memory 232 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), and/or CPU cache memory.

The audio interface 236 may be connected to a speaker, a chime, a buzzer, or other device that may be operable to generate a sound. The audio interface 236 may also be connected to a microphone or other device to receive a voice input from an occupant of the vehicle 226. The audio interface 236 may also be communicatively coupled to the microprocessor 230. The audio interface 236 may be a part of an in-vehicle infotainment (IVI) system or head unit of the vehicle 226.

The display 238 may refer to a display screen to display various types of information to the occupants of the vehicle 226. In accordance with an embodiment, the display 238 may be a touch screen display that may receive an input from a vehicle user. The vehicle user may provide the input, such as user preferences, via a user interface (UI). One or more rules related to processing of the received information may be pre-configured by use of the UI. The UI may be an application-based UI associated with the ECU 228 or the head unit (HU) of the vehicle 226. Examples of the display 238 may include, but are not limited to a heads-up display (HUD) or a head-up display with an augmented reality system (AR-HUD), a driver information console (DIC), a projection-based display, and/or an electro-chromic display. The vehicle 226 may include other input/output (I/O) devices that may be configured to communicate with the microprocessor 230.

The powertrain control system 240 may refer to an onboard computer of the vehicle 226 that controls operations of an engine and a transmission system (when provided) of the vehicle 226. The powertrain control system 240 may control ignition, fuel injection, emission systems, and/or operations of a transmission system (when provided) and the braking system 244.

The steering system 242 may be associated with the powertrain control system 240. The steering system 242 may include a steering wheel and/or an electric motor (provided for a power-assisted steering) that may be used by the vehicle user to control movement of the vehicle 226 in manual mode or a semi-autonomous mode. In accordance with an embodiment, the movement or steering of the vehicle 226 may be automatically controlled when the vehicle 226 is in autonomous mode. Examples of the steering system 242 may include, but are not limited to, an autonomous steering control, a power-assisted steering system, a vacuum/hydraulic-based steering system, an electrohydraulic power-assisted system (EHPAS), or a "steer-by-wire" system, known in the art The braking system 244 may be used to stop or slow down the vehicle 226 by application of frictional forces. The braking system 244 may be configured to receive a command from the powertrain control system 240 under the control of the microprocessor 230, when the vehicle 226 is in an autonomous mode or a semi-autonomous mode. In accordance with an embodiment, the braking system 244 may be configured to receive a command from the body control module 248 and/or the microprocessor 230 when the microprocessor 230 preemptively detects an obstacle, road hazards, and/or a movement of the vehicle 226 beyond a pre-determined distance range.

The sensing system 246 may refer to the one or more vehicle sensors to sense or detect the geospatial position of the vehicle 226. The sensing system 246 may include one or more proximity sensors to sense the first proximity range or the second proximity range of the vehicle 226, from external devices. The sensing system 246 may be operatively connected to the microprocessor 230 to provide input signals. One or more communication interfaces, such as a CAN interface, may be provided in the sensing system 246 to connect to the in-vehicle network 250. Examples of the sensing system 246 may include, but are not limited to, the vehicle speed sensor, the odometric sensors, a speedometer, a yaw rate sensor, a global positioning system (GPS), a steering angle detection sensor, a vehicle travel direction detection sensor, a magnometer, an image sensor, a touch sensor, and/or an infrared sensor.

The body control module 248 may refer to another electronic control unit that comprises suitable logic, circuitry, interfaces, and/or code that may be configured to control various electronic components or systems of the vehicle 226, such as a central door locking system. The body control module 248 may be configured to receive a command from the microprocessor 230 to unlock a vehicle door of the vehicle 226. The body control module 248 may also relay the command to other suitable vehicle systems or components.

The in-vehicle network 250 may include a medium through which the various control units, components, or systems of the vehicle 226, such as the ECU 228, the wireless communication system 234, the powertrain control system 240, the sensing system 246, and/or the body control module 248, may communicate with each other. In accordance with an embodiment, in-vehicle communication of audio/video data for multimedia components may occur by use of Media Oriented Systems Transport (MOST) multimedia network protocol of the in-vehicle network 250. The in-vehicle network 250 may facilitate access control and/or communication between the ECU 228 and other ECUs, such as a telematics control unit (TCU), of the vehicle 226. Various devices in the vehicle 226 may be configured to connect to the in-vehicle network 250, in accordance with various wired and wireless communication protocols. One or more communication interfaces, such as the CAN interface, a Local Interconnect Network (LIN) interface, may be used by the various components or systems of the vehicle 226 to connect to the in-vehicle network 250. Examples of the wired and wireless communication protocols for the in-vehicle network 250 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The battery 252 may be source of electric power for one or more electric circuits or loads (not shown). For example, the loads may include, but are not limited to various lights, such as headlights and interior cabin lights, electrically powered adjustable components, such as vehicle seats, mirrors, windows or the like, and/or other in-vehicle infotainment system, such as radio, speakers, electronic navigation system, electrically controlled, powered and/or assisted steering, such as the steering system 242. The battery 252 may be a rechargeable battery. The battery 252 may be a source of electrical power to the ECU 228 (shown by dashed lines), the one or more sensors of the sensing system 246, and/or one or more hardware units, such as the display 238, of the in-vehicle infotainment system. The battery 252 may be a source of electrical power to start an engine of the vehicle 226 by selectively providing electric power to an ignition system (not shown) of the vehicle 226.

The vehicle power system 254 may regulate the charging and the power output of the battery to various electric circuits and the loads of the vehicle 226, as described above. When the vehicle 226 is a hybrid vehicle or an autonomous vehicle, the vehicle power system 254 may provide the required voltage for all of the components and enable the vehicle 226 to utilize the power of the battery 252 for a sufficient amount of time. In accordance with an embodiment, the vehicle power system 254 may correspond to power electronics, and may include a microcontroller that may be communicatively coupled (shown by dotted lines) to the in-vehicle network 250. In such an embodiment, the microcontroller may receive command from the powertrain control system 240 under the control of the microprocessor 230.

In operation, in accordance with an exemplary embodiment, a first set of data may be generated by the client system 256, in conjunction with the ECU 228, based on data received from various systems, such as the powertrain control system 240, the steering system 242, the braking system 244, the sensing system 246, and/or the sensing system 246. The transmission of the first set of data may be based on an occurrence of an event, such as a vehicle breakdown, associated with the vehicle 226. The occurrence of such events may be detected by the sensing system 246. The first set of data may correspond to one or more services provided by the set of cloud-based services 106 associated with the vehicle. In accordance with an embodiment, the client system 256 may transmit the generated first set of data to the server 102.

In accordance with an embodiment, the client system 256 of the vehicle 226 may receive one or more responses corresponding to the transmitted first set of data from the server 102. The one or more responses may be determined by the server 102 based on extraction of intelligent information from the transmitted first set of data and/or a second set of data. In an instance, the second set of data may correspond to the first set of electronic devices, such as a smartphone of the driver of the vehicle 226, associated with a plurality of services. In accordance with an embodiment, the one or more responses may include one or more recommendations for the user, such as a driver, of the vehicle 226. In accordance with an embodiment, the one or more responses may include one or more control instructions based on which the powertrain control system 240, the steering system 242, the braking system 244, the sensing system 246, and/or the sensing system 246 may be automatically controlled by the ECU 228.

In accordance with another exemplary embodiment, the occurrence of an event, as detected by the sensing system 246, may correspond to reception of a request from a user associated with the vehicle 226 to determine optimal time to travel to a location. In such a case, the first set of data may include a preferred mode of transit, such as a car or a train, to the destination, and other such preferences provided by the user.

In such a case, the server 102 may be configured to retrieve a second set of data that corresponds to a traffic pattern of a route to the location that corresponds to the user preference associated with the automotive service 106a. Such a traffic pattern may also be retrieved from the first set of electronic devices associated with one or more vehicles associated with the automotive service 106a. In accordance with an embodiment, the traffic pattern may also be retrieved from the local database 110a, associated with the automotive service 106a. Based on the pattern analysis of the first set and/or the second set of data, the server 102 may be configured to generate one or more responses and/or one or more recommendations that correspond to the occurred event. For instance, the generated one or more responses may correspond to an optimal time to travel to a destination and best route to follow to reach the destination, based on the pattern analysis of the first set of data that may comprise a preferred time to travel to the location to avoid traffic. The server 102 may be configured to transmit the generated one or more responses and/or one or more recommendations to the client system 256, via the communication network 112.

The client system 256 may be configured to receive the one or more responses and/or one or more recommendations transmitted by the server 102. The client system 256 of the vehicle 226 may be configured to render the received one or more responses and/or generated one or more recommendations to the user, via the audio interface 236 and/or a visual interface via the display 238. In such cases, the audio interface 236 and/or the display 238 may be powered by the battery 252 associated with the vehicle power system 254. Based on the rendered one or more responses, the user may issue one or more commands to modify the one or more operational parameters associated with the vehicle.

In accordance with another exemplary embodiment, the second set of data may include an option based on which another user may be allowed or denied to track the GPS location of the vehicle 226, via the communication network 112. In case the other user is an occupant of another vehicle, then the ECU 228 may be configured to directly connect to the ECU of the other vehicle by use of a dynamically established connected vehicle network (CVN).

Figure 3A:
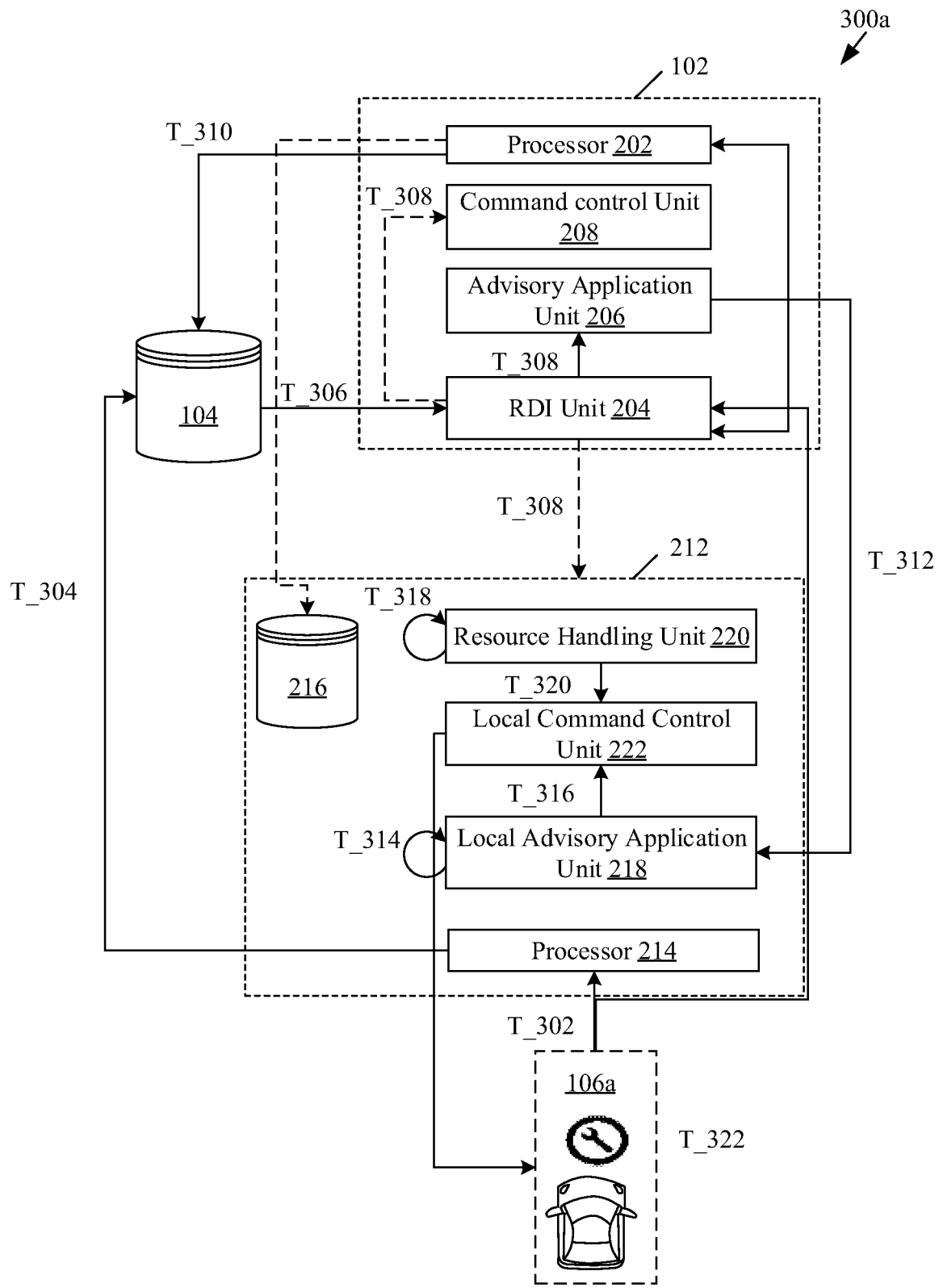
FIGS. 3A, 3B, and 3C illustrate exemplary scenarios in a unified connected network, in accordance with an embodiment of the disclosure.
Figure 3B:
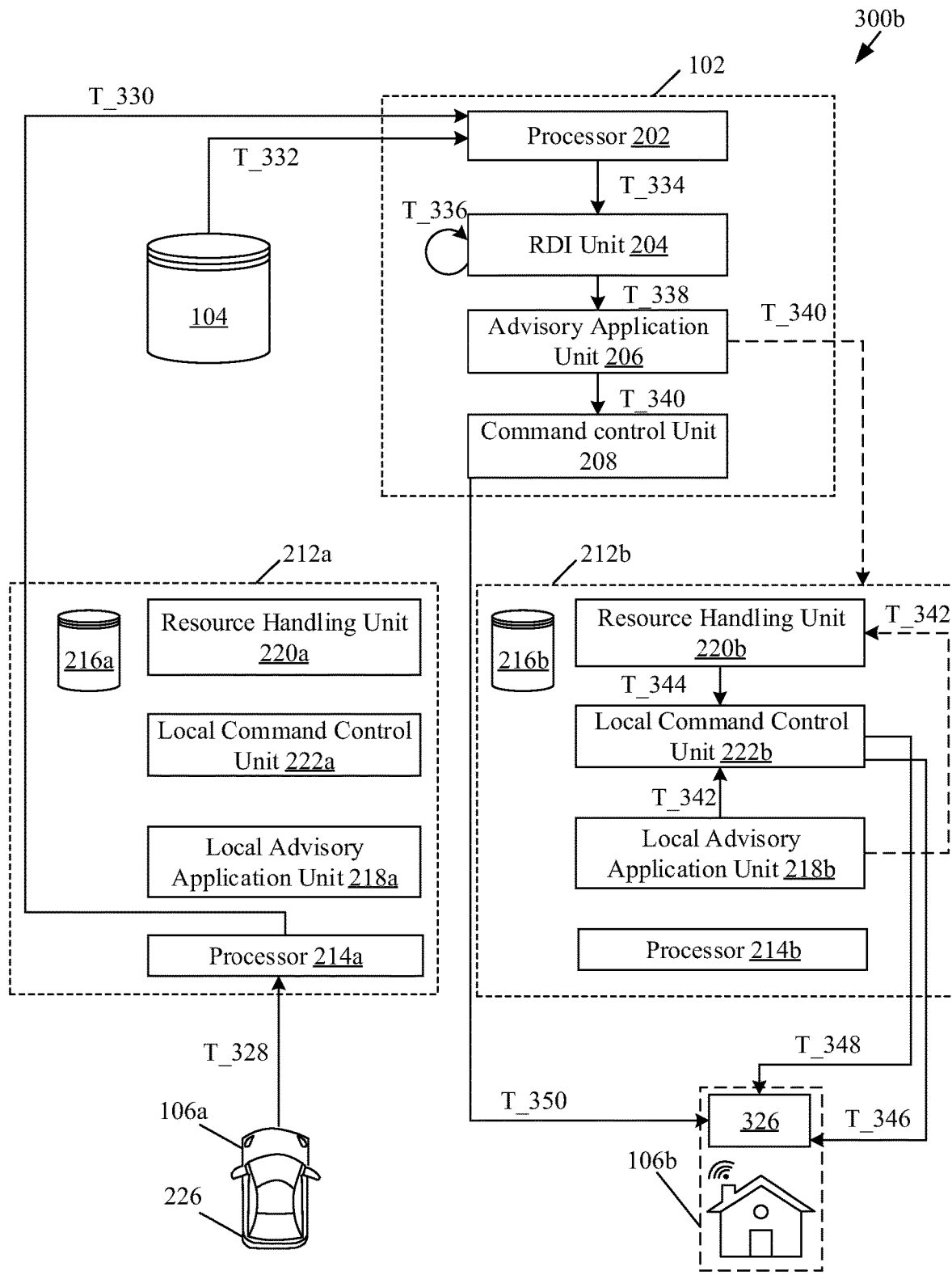
Figure 3C:
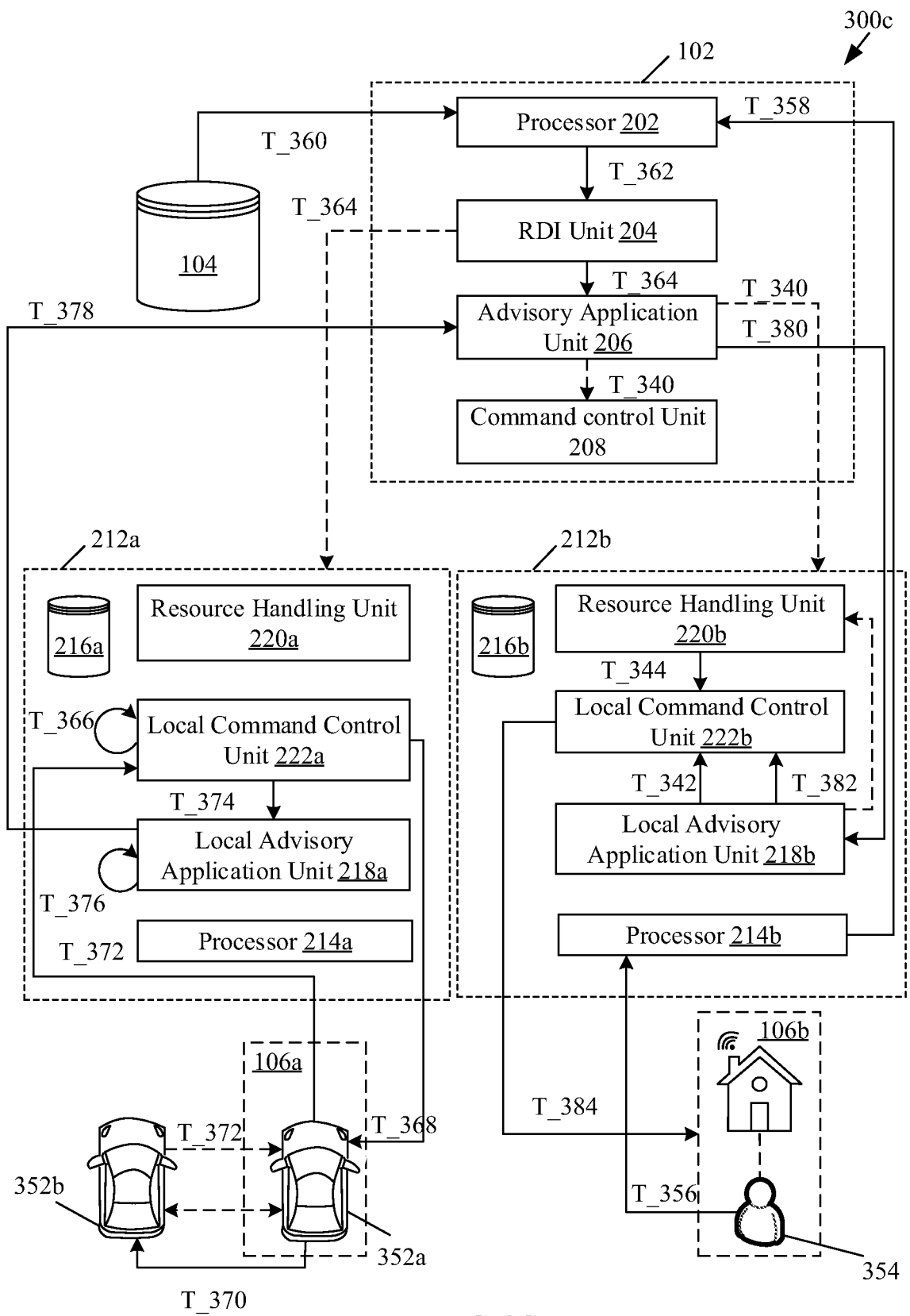

FIGS. 3A, 3B, and 3C illustrate exemplary scenarios to provide a unified connected network, in accordance with an embodiment of the disclosure. FIGS. 3A, 3B, and 3C are explained in conjunction with elements from FIGS. 1, 2A, and 2B.

With reference to FIG. 3A, there is shown an architecture 300a that illustrates a first exemplary scenario. The architecture 300a may comprise the server 102, which may be communicatively coupled to the client system 212. The client system 212, similar to the client system 108a (FIG. 1), may be associated with the automotive service 106a of the set of cloud-based services 106. The server 102 may comprise one or more elements, such as the processor 202, the RDI unit 204, the advisory application unit 206, the command control unit 208, and/or the transceiver 210, as explained in FIG. 2A. The client system 212 may comprise one or more elements, such as the processor 214, the local database 216, the local advisory application unit 218, the resource handling unit 220, the local command control unit 222, and/or the transceiver 224, as explained in FIG. 2B.

At time "T_302", the processor 214 of the client system 212 may be configured to receive a request from a first user, via an electronic device. The electronic device may be associated with a service of the set of cloud-based services 106, such as the automotive service 106a. The received request may correspond to a first set of data. The received request may comprise an initial GPS location, such as a "location A" of the user. The received request may further comprise a final GPS location, such as a "location B". The received request may further comprise a preferred time, such as "8 AM", to travel to the final GPS location. Further, the received request may correspond to a request to determine an optimal time to travel to the final GPS location. Furthermore, the received request may include a preferred time to travel to the final GPS location.

At time "T_304", the processor 214 may be configured to transmit a request to the central database 104, to retrieve a second set of data that corresponds to traffic information associated with the initial GPS location and the final GPS location. The retrieved traffic information may comprise a number of traffic signals that exist between different possible routes between the initial GPS location and the final GPS location. The retrieved traffic information may further comprise a volume of traffic that may exist between different possible routes between the initial GPS location and the final GPS location. In accordance with an instance of the exemplary scenario, the second set of data may be retrieved from the local database 216.

At time "T_306", the central database 104 may be configured to communicate the received first set of data and/or the retrieved second set of data, to the RDI unit 204. The RDI unit 204, in conjunction with the processor 202, may be configured to extract intelligent information based on pattern analysis of the first set and/or the second set of data and derive RDI, as explained in FIG. 2A. The extracted intelligent information may correspond to travel time associated with an optimal route that may be taken by the user to traverse from the initial GPS location to the final GPS location. The optimal route may be a route that is the shortest route and offers the minimum waiting time at one or more traffic signals. The extracted intelligent information may further correspond to a travel slot that may be recommended to the user to control the traffic at a selected route.

At time "T_308", the RDI unit 204, in conjunction with the processor 202, may be configured to transmit the extracted intelligent information and the derived RDI to the advisory application unit 206.

At time "T_312", the advisory application unit 206 may be configured to transmit the one or more responses to the local advisory application unit 218 of the client system 212. The advisory application unit 206 may determine the one or more responses based on the received extracted intelligent information and the derived RDI. The one or more responses may comprise a message to report the time associated with the routes that may be taken by the user to travel to the final GPS location. For example, the message may correspond to an exemplary message, such as "The expected time of arrival at the location B is 11 PM". The determined one or more responses may be communicated to the command control unit 208, via the transceiver 210. In accordance with an instance of the exemplary scenario, one or more responses may be directly communicated to the client system 212.

In accordance with an instance of the exemplary scenario, at time "T_310", the processor 202 may be configured to update the one or more responses in real time based on the second set of data. For example, based on the monitoring of the initial GPS location of the user, the time of arrival of the user at the final GPS location may be updated in real time. Further, the time of arrival may be updated in the central database 104 and/or the local database 216, based on the machine learning algorithm. An update of the second set of data may be performed until the user arrives at the final GPS location.

In accordance with an embodiment, the advisory application unit 206 may be configured to refine one or more APIs that may generate one or more recommendations, based on the one or more responses, as explained in FIG. 2A. The generated one or more recommendations may be rendered on the personalized UI, at the first set of electronic devices associated with the automotive service 106a.

At time "T_314", based on the one or more one or more responses received by the client system 212, the local advisory application unit 218 may be configured to generate one or more recommendations, based on the one or more responses. The generation of the one or more recommendations may be based on one or more APIs, as explained in FIG. 2B. At time "T_316", the generated one or more recommendations may be transmitted to the local command control unit 222. At time "T_318", based on the generated one or more recommendations, the resource handling unit 220 may be configured to determine one or more available electronic devices at which to render the generated one or more recommendations, as explained in FIG. 2B. At time "T_320", the determined one or more available electronic devices may be transmitted to the local command control unit 222. At time "T_322", the local command control unit 222 may be configured to render the one or more recommendations on a personalized UI, at the determined one or more available electronic devices associated with the automotive service 106a. In accordance with an embodiment, the local command control unit 222 may be configured to render the one or more recommendations based on instructions received directly from the command control unit 208. In accordance with an embodiment, the update may be communicated back to the server 102.

With reference to FIG. 3B, there is shown an architecture 300b that illustrates a second exemplary scenario. The architecture 300b may comprise the server 102, which may be communicatively coupled to two instances, such as 212a and 212b, of the client system 212. The two instances 212a and 212b may be similar to the client systems 108a and 108b (FIG. 1), respectively. The client system 212a may be associated with the automotive service 106a of the set of cloud-based services 106. Further, a vehicle, such as the vehicle 226, may be associated with the automotive service 106a. The client system 212b may be associated with the home automation service 106b of the set of cloud-based services 106. Further, the first set of electronic devices, such as an electronic device 326, may be associated with the home automation service 106b. The client system 212a may comprise a processor 214a, a local database 216a, a local advisory application unit 218a, a resource handling unit 220a, a local command control unit 222a, and/or a transceiver 224a, which are similar to the components of the client system 212, as explained in FIG. 2B. Similarly, the client system 212b may comprise a processor 214b, a local database 216b, a local advisory application unit 218b, a resource handling unit 220b, a local command control unit 222b, and/or a transceiver 224b, which are similar to the components of the client system 212, as explained in FIG. 2B.

In accordance with the second exemplary scenario, the electronic device 326 may correspond to an air conditioner (AC). Further, the central database 104 may be configured to store the operational status of the electronic device 326. The operational status of the electronic device 326 may also be stored in the local database 110b, associated with the home automation service 106b. The server 102 may comprise one or more elements, such as the processor 202, the RDI unit 204, the advisory application unit 206, the command control unit 208, and/or the transceiver 210, as explained in FIG. 2A.

At time "T_328", the processor 214a of the client system 212a may be configured to receive a first set of data from a vehicle, such as the vehicle 226. The reception of the first set of data may be based on an event, such as a breakdown of the vehicle 226. The first set of data may comprise the vehicle 226 breakdown information and a geographical position of the vehicle 226. At time "T_330", the processor 214 may be configured to transmit the first set of data that comprises the vehicle breakdown information to the processor 202.

At time "T_332", the processor 202 may be configured to retrieve a second set of data from the central database 104. The retrieved second set of data may correspond to operational status of the first set of electronic devices, such as the electronic device 326, associated with the home automation service 106b. In accordance with an instance of the exemplary scenario, the second set of data of the electronic device 326 may be retrieved from the local database 110b, via the transceiver 210a.

At time "T_334", the processor 202 may be configured to communicate the received first set of data and/or the retrieved second set of data, to the RDI unit 204. At time "T_336", based on the first set and/or the second set of data, the RDI unit 204, in conjunction with the processor 202, may be configured to extract intelligent information and derive RDI based on pattern analysis of the first set and/or the second set of data, as explained in FIG. 2A. The extracted intelligent information and the derived RDI may correspond to a time of arrival of the first user at the location of the electronic device 326.

At time "T_338", the determined one or more responses may be communicated to the advisory application unit 206 and/or the command control unit 208, via the transceiver 210. In accordance with an instance of the second exemplary scenario, one or more responses may be directly communicated to the client system 212b, associated with the home automation service 106b. The advisory application unit 206 may be configured to determine one or more responses based on the pattern analysis and derived RDI. The one or more responses may comprise a notification to inform a second user of, the time of arrival of the first user at the location of the electronic device 326, based on the pattern analysis of the breakdown information. The notification may further comprise information that corresponds to a GPS location of the first user. The notification may correspond to an exemplary message, such as "The vehicle of the first user has broken down. The expected time of arrival is 11 PM". Further, based on the received one or more responses, the advisory application unit 206 may be configured to generate one or more recommendations based on the one or more responses. The generation of the one or more recommendations may be based on one or more APIs, as explained in FIG. 2A.

At time "T_340", the advisory application unit 206 may be configured to transmit the one or more responses to the client system 212b. In accordance with an embodiment, the advisory application unit 206 may be configured to transmit the one or more recommendations and/or responses to the client 212a for rendering at the personalized UI. In accordance with an embodiment, the generated one or more recommendations may be transmitted to the command control unit 208.

At time "T_342", when the determined one or more responses are communicated to the client system 212b, the local advisory application unit 218b may be configured to generate one or more recommendations, based on the one or more responses. The generation of the one or more recommendations may be based on one or more APIs, as explained in FIG. 2B. The generated one or more recommendations may be transmitted to the local command control unit 222b and/or the resource handling unit 220b. In accordance with an instance of the second exemplary scenario, the one or more recommendations may correspond to a notification to postpone a time to switch ON the AC, based on certain calculations, such as an estimation of a time of arrival of the first user at the location of the AC. For instance, when a delay is estimated in the time of arrival of the first user. At time "T_344", based on the generated one or more recommendations, the determination of the one or more available electronic devices may be performed by the resource handling unit 220b, as explained in FIG. 2B. At time "T_346", the local command control unit 222b of the client system 212b may be configured to render the one or more recommendations on a personalized UI, at the one or more available electronic devices, such as the electronic device 326, determined by the resource handling unit 220b. Based on the rendered one or more recommendations, a second user (associated with the home automation service 106b) may change the operational status of the electronic device 326.

At time "T_348", when the determined one or more responses are communicated to the client system 212b, the local command control unit 222b may be configured to generate one or more control instructions, based on the one or more responses. The generation of the one or more control instructions may be based on one or more APIs, as explained in FIG. 2B. Based on the generated one or more control instructions and/or a set of user preferences associated with the second set of data, the command control unit 208 may be configured to perform one or more actions on the electronic device 326. Such performed one or more actions may correspond to the postponement of the pre-programmed time to switch ON the AC, based on the based on the estimated time of arrival of the first user.

At time "T_350", when the determined one or more responses are communicated to the command control unit 208 by the advisory application unit 206, the command control unit 208 may be configured to generate one or more control instructions, based on the one or more responses. The generation of the one or more control instructions may be based on one or more APIs, as explained in FIG. 2A. Based on the generated one or more control instructions and/or a set of user preferences associated with the second set of data, the command control unit 208 may be configured to control the electronic device 326 and perform one or more actions. Such performed one or more actions may correspond to the postponement of the pre-programmed time to switch ON the AC, based on the estimated time of arrival of the first user. In accordance with an embodiment, the update may be communicated back to the server 102.

With reference to FIG. 3C, there is shown an architecture 300c that illustrates a third exemplary scenario. The architecture 300c may comprise the server 102, which may be communicatively coupled to two instances 212a and 212b of the client system 212. The two instances 212a and 212b may be similar to the client systems 108a and 108b (FIG. 1), respectively. The client system 212a may be associated with the automotive service 106a of the set of cloud-based services 106. Further, the client system 212a may be associated with the first vehicle 352a. Further, a user 354 may be associated with the home automation service 106b. The client system 212a may comprise a processor 214a, a local database 216a, a local advisory application unit 218a, a resource handling unit 220a, a local command control unit 222a, and/or a transceiver 224a, which are similar to the components of the client system 212, as explained in FIG. 2B. Similarly, the client system 212b may comprise a processor 214b, a local database 216b, a local advisory application unit 218b, a resource handling unit 220b, a local command control unit 222b, and/or a transceiver 224b, which are similar to the components of the client system 212, as explained in FIG. 2B.

In accordance with an exemplary scenario, the architecture 300c may comprise a second vehicle 352b, which may not be directly communicatively coupled to the automotive service 106a. The second vehicle 352b may be communicatively coupled to the first vehicle 352a, based on a connected vehicle network (CVN). In accordance with another exemplary scenario, the CVN between the first vehicle 352a and the second vehicle 352b may be dynamically created, based on one or more responses received from the server 102.

At time "T_356", the processor 214b of the client system 212b may be configured to receive the first set of data that may correspond to a request from the user 354 to track the GPS location of the second vehicle 352b. At time "T_358", the processor 214b may be configured to transmit the received first set of data to the processor 202 of the server 102.

At time "T_360", the processor 202 may be configured to retrieve the second set of data from the central database 104. The retrieved second set of data may correspond to a set of pre-stored user preferences associated with the second vehicle 352b. The second set of data may comprise information of whether the user of the second vehicle 352b has enabled an option to allow the user 354 to track the GPS location of the second vehicle 352b. The second set of data associated with the user of the second vehicle 352b may further comprise a list of one or more users with whom the GPS location of the second vehicle 352*b* may be shared. In accordance with an embodiment, any configuration changes performed on the second set of data are synchronized with the second set of data stored at the central database 104.

At time "T_362", the processor 202 may be configured to communicate the received first set of data and/or the retrieved second set of data, to the RDI unit 204. Based on the first set and/or the second set of data, the RDI unit 204, in conjunction with the processor 202, may be configured to extract intelligent information and derive RDI based on pattern analysis of the first set and/or the second set of data, as explained in FIG. 2A. The extracted intelligent information and the derived RDI may correspond to determination of whether the user of the second vehicle 352*b* is enabled for an option to allow the user 354 to track the GPS location of the second vehicle 352*b*, via the communication network 112 or by use of a dynamically established CVN with one or more vehicles, such as the first vehicle 352*a*. The extracted intelligent information may further correspond to validation of the identity of the user 354 with the list of one or more users with whom the GPS location of the second vehicle 352*b* may be shared.

At time "T_364", the RDI unit 204 may be configured to transmit the extracted intelligent information and the derived RDI to the advisory application unit. When it is determined that the user 354 has been enabled to track the GPS location of the second vehicle 352*b*, the advisory application unit 206, in conjunction with the RDI unit 204, may be configured to determine one or more responses. The determined one or more responses may comprise data related to one or more vehicles that may be in the vicinity of the second vehicle 352*b*. Such a determination may be based on the pattern analysis of the first set and/or the second set of data. Further, such a determination may be based on a location history of the second vehicle 352*b* retrieved from the central database 104. Based on a correlation of the location history of the second vehicle 352*b* with the location histories of one or more vehicles, such as the first vehicle 352*a*, the processor 202 may be configured to select the first vehicle 352*a*, to establish a CVN with the second vehicle 352*b*. The advisory application unit 206, in conjunction with the RDI unit 204 may be further configured to transmit the determined information to the client system 212*a*.

In accordance with an embodiment, when it is determined that the user has disabled the option to allow the user 354 to track the GPS location, the advisory application unit 206 may be configured to generate one or more recommendations, based on one or more APIs stored in the central database 104. Such generated one or more recommendations may correspond to a notification to inform the user 354 that the GPS location of the second vehicle 352*b* could not be determined.

At time "T_366", when the determined one or more responses are received by the client system 212*a*, the local command control unit 222*a* may be configured to generate one or more control instructions, based on the received one or more responses. At time "T_368", the generated one or more control instructions may be transmitted to the first vehicle 352*a*. At time "T_370", based on the generated one or more control instructions, an ECU of the first vehicle 352*a* may be configured to establish a CVN with the second vehicle 352*b*. At time "T_372", based on the established CVN, the local command control unit 222*a* may be configured to perform retrieval of the GPS location of the second vehicle 352*b*, via the established CVN. At time "T_374", the retrieved GPS location may be transmitted to the local advisory application unit 218*a* of the automotive service 106*a*.

At time "T_376", the local advisory application unit 218*a*, in conjunction with the processor 214*a*, may be configured to generate a notification, based on the determined GPS location of the second vehicle 352*b*. At time "T_378", the generated notification may be transmitted to the advisory application unit 206. At time T_380", the advisory application unit 206 of the server 102 may be configured to relay the received notification to the local advisory application unit 218*b* of the client system 212*b*. At time "T_382", the local advisory application unit 218*b* of the client system 212*b* may be configured to transmit the notification to the local command control unit 222*b*. At time "T_384", the local command control unit 222*b* may be configured to render the retrieved GPS location of the second vehicle 352*b* from the notification on a personalized UI associated with the home automation service 106*b* and the user 354. In accordance with an embodiment, the retrieved GPS location of the second vehicle 352*b* is communicated to the server 102.

Figure 4:
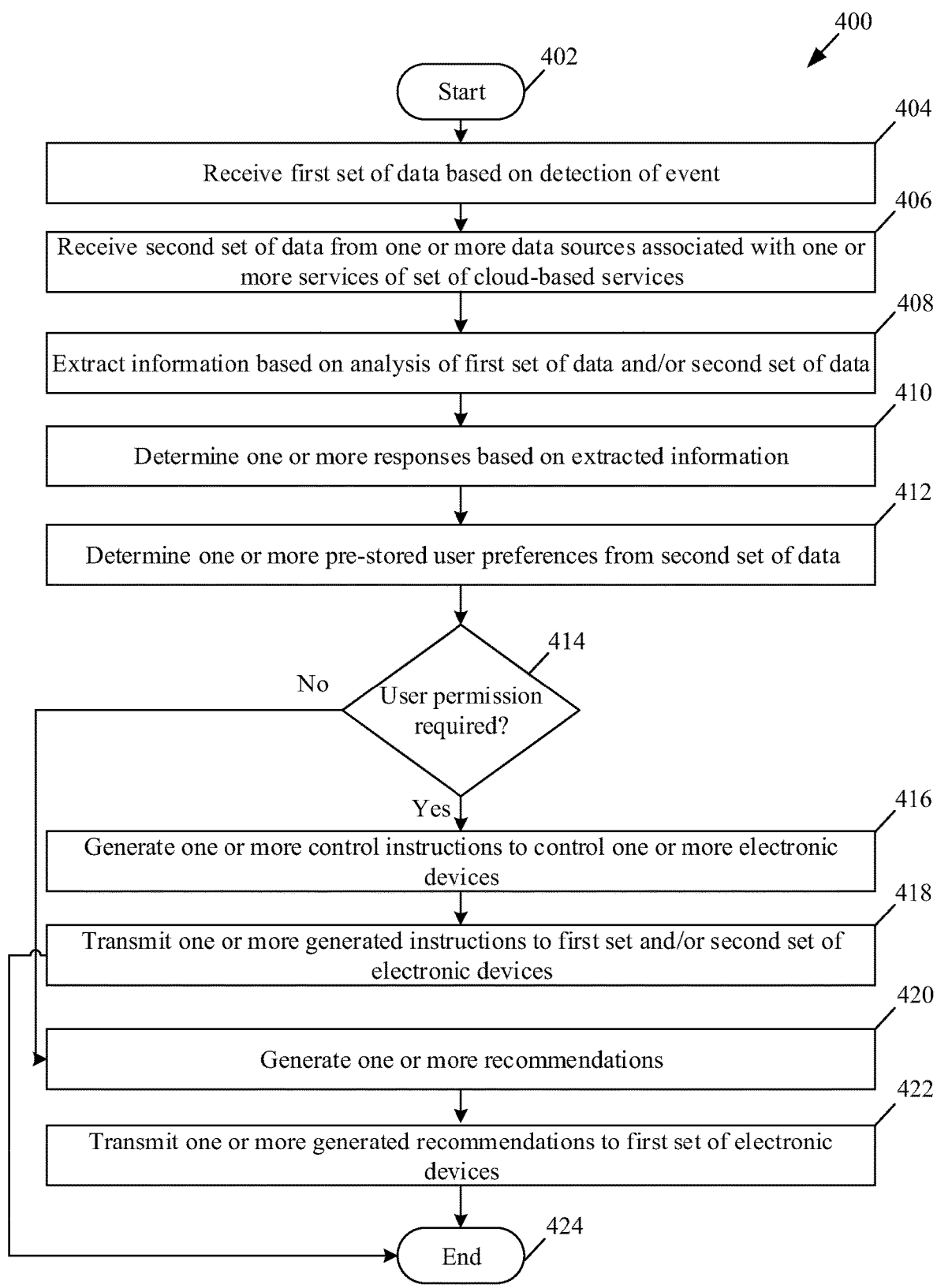
FIG. 4 comprises a flowchart that illustrates an exemplary method to provide a unified connected network, in accordance with an embodiment of the disclosure.

FIG. 4 comprises a flowchart that illustrates an exemplary method to provide a unified connected network, in accordance with an embodiment of the disclosure. With reference to FIG. 4 there is shown a flowchart 400. The flowchart 400 is described in conjunction with FIGS. 1, 2A, and 2B. The method starts at step 402 and proceeds to step 404.

At step 404, a first set of data may be received by the processor 202 (FIG. 2A) from a client system 212 (FIG. 2B), based on detection of an event. In accordance with an embodiment, the client system 212 may be configured to store the received first set of data in the local database 216. The client system 212 may be configured to transmit the received first set of data to the server 102, via the communication network 112. In an instance, such an event may be detected by the ECU 228 of the vehicle 226 that may be associated with one or more services of the set of cloud-based services 106, such as the automotive service 106*a*, as described in FIG. 1. In accordance with an embodiment, the event may correspond to detection of a breakdown of a vehicle associated with the automotive service 106*a*. The first set of data may include, but is not limited to, a preferred time to travel to a destination, Global Positioning Satellite (GPS) coordinates of a vehicle, one or more motion and/or vehicle parameters of the vehicle, and/or set of pre-stored user preferences associated with the user. In accordance with an embodiment, the first set of data may be provided by the user, for example, via the ECU of the vehicle.

At step 406, based on the reception of the first set of data, the processor 202 may be configured to receive a second set of data from one or more data sources, such as the central database 104, the plurality of local databases 110, and/or one or more services of the set of cloud-based services 106, such as the home automation service 106*b*, associated with the first set of electronic devices, as described in FIG. 1. The second set of data may include one or more operating parameters of the first set of electronic devices associated with the one or more services of the set of cloud-based services 106. The second set of data may further include one or more of a traffic pattern associated with a location of the vehicle of the user. The second set of data may further include one or more emergency contacts and/or one or more preferred vehicle maintenance service providers associated with the user of the vehicle. The second set of data may further include a rating associated with the maintenance service provider. The second set of data may further include a set of pre-defined permissions to modify operational parameters of the first set of electronic devices associated with one or more of the set of cloud-based services 106.

At step 408, intelligent information may be extracted and RDI may be derived based on the pattern analysis of the first set and/or the second set of data, by the RDI unit 204 in conjunction with the processor 202, as described in FIG. 2A. At step 410, based on the extracted intelligent information and the derived RDI, one or more responses may be determined by the advisory application unit 206. In accordance with an embodiment, the determined one or more responses may be transmitted to the client system 212.

At step 412, based on the second set of data, one or more pre-stored user preferences may be determined by the processor 202. The one or more pre-stored user preferences may include one or more user permissions that may be required to change the operational status of first set of electronic devices. At step 414, it may be determined whether one or more user permissions are required to change the operational status of first set of electronic devices associated with the plurality of client systems 108, as described in FIG. 2A. In instances when one or more user permissions are required to change the operational status of the first set of electronic devices associated with the plurality of client systems 108, the control passes to step 416. In instances when one or more user permissions are not required to change the operational status of the first set of electronic devices associated with the plurality of client systems 108, the control passes to step 420.

At step 416, one or more control instructions may be generated by the command control unit 208, as described in FIG. 2A. The one or more control instructions may be operable to control the first set and/or the second set of electronic devices. At step 418, the generated one or more control instructions may be transmitted to the first set and/or the second set of electronic devices, as described in FIG. 2A. The control passes to end step 424.

At step 420, one or more recommendations may be generated by the advisory application unit 206, as described in FIG. 2A, based one or more responses generated by the server 102. At step 422, the generated one or more recommendations may be transmitted to the first set of electronic devices. In accordance with an embodiment, the server 102 may be configured to communicate the one or more responses to the client system 212. In such a case, the client system 212 may be configured to generate one or more recommendations and rendered the one or more recommendations at the first set of electronic devices, via one or more APIs. The control passes to end step 424.

In accordance with an embodiment of the disclosure, the system to provide a unified connected network may comprise one or more circuits in a server. The one or more circuits may be communicatively coupled to an electronic control unit (ECU) of a vehicle and a first set of electronic devices. The one or more circuits, such as the processor 202, may be configured to receive a first set of data from the ECU of the vehicle and/or a second set of data from the first set of electronic devices associated with a plurality of services. The first set and/or the second set of data may be received based on detection of an event by the ECU. The one or more circuits, such as the RDI unit 204, may be configured to extract information from the received first set of data and/or the received second set of data. The information may be extracted based on analysis of the received first set of data and/or the received second set of data. The one or more circuits, such as the advisory application unit 206, may be further configured to determine one or more responses that correspond to the detected event. The determination of the one or more responses may be based on the extracted information. The one or more circuits, such as the processor 202, may be further configured to transmit the one or more responses to a second set of electronic devices associated with the plurality of services.

Various embodiments of the disclosure may provide a non-transitory, computer readable medium and/or storage medium stored thereon, a machine code and/or a computer program with at least one code section executable by a machine and/or a computer to provide a unified connected network. The at least one code section may cause the machine and/or computer to perform the steps that comprise a reception, by a server, of a first set of data from an ECU of a vehicle and/or a second set of data from a first set of electronic devices associated with a plurality of services. The first set and/or the second set of data may be received based on detection of an event by the ECU. The ECU and the first set of electronic devices may be communicatively coupled to the server. The steps may further comprise extraction of information, by the server, from the received first set of data and/or the received second set of data. The information may be extracted based on analysis of the received first set of data and/or the received second set of data. The server may further determine one or more responses that correspond to the detected event. The determination of the one or more responses may be based on the extracted information. The one or more responses may be transmitted, by the server, to a second set of electronic devices associated with the plurality of services.

In accordance with an embodiment of the disclosure, the system to provide a unified connected network may comprise a vehicle that may include at least a battery, a display, and one or more circuits, such as the processor 202. The battery, display, and circuits may be controlled by an ECU used in the vehicle. The one or more circuits may be configured to generate a first set of data, based on an event detected by the ECU. The one or more circuits may be further configured to transmit the generated first set of data to a server, such as the server 102 which may be communicatively coupled to the vehicle. The one or more circuits may be further configured to receive one or more responses that correspond to the transmitted first set of data, from the server 102. The received one or more responses may be determined by the server 102, based on extraction of information from the transmitted first set of data and/or a second set of data. The second set of data may correspond to the first set of electronic devices associated with a plurality of services. The one or more responses may be shown on the display that may be powered by the battery.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, comprising:
a server, wherein
one or more circuits in said server are configured to:
receive a first set of data from an electronic control unit (ECU) of a vehicle based on detection of an event, wherein
said event is detected by said ECU, and
said first set of data comprises breakdown information associated with breakdown of said vehicle;
receive a second set of data from a database, based on said reception of said first set of data, wherein
said second set of data comprises an operating parameter of a first electronic device of a first set of electronic devices,
said database is external to each of said server and said vehicle,
each of said first set of electronic devices is associated with at least one service of a plurality of services,
said first electronic device is associated with a home automation service of said plurality of services, and
said database is associated with said at least one service;
extract specific information from said first set of data and said second set of data, based on analysis of said first set of data and said second set of data;
determine a response corresponding to said event, based on said specific information;
generate a control instruction based on said determined response, wherein said control instruction is generated when a user permission is required to change said operating parameter of said first electronic device; and
transmit said generated control instruction to a second electronic device of one of said first set of electronic devices or a second set of electronic devices.

2. The system according to claim 1, wherein said determined response corresponds to a time to one of switch ON said first electronic device or switch OFF said first electronic device.

3. The system according to claim 1, wherein said one or more circuits are further configured to transmit said determined response to said vehicle via an established communication channel.

4. The system according to claim 1, wherein said second set of electronic devices are controllable by said at least one service of said plurality of services based on said determined response and an advisory application.

5. The system according to claim 1, wherein said one or more circuits are further configured to:
trigger a first service of said plurality of services; and
generate recommendations corresponding to said first service based on said determined response.

6. The system according to claim 5, wherein
said one or more circuits are further configured to trigger a second service of said plurality of services based on said determined response, and
said second service controls at least one of said vehicle or said first set of electronic devices to present said recommendations on a user interface.

7. The system according to claim 1, wherein
said one or more circuits are further configured to trigger a service of said plurality of services,
said service corresponds to an action based on said control instruction, and
said action corresponds to said determined response based on said control instruction.

8. The system according to claim 7, wherein said control instruction comprises at least one of a set of user-defined permissions, a set of stored user preferences corresponding to a user, or a user input.

9. The system according to claim 1, wherein said one or more circuits are further configured to customize said determined response based on said first set of data received from said ECU.

10. The system according to claim 1, wherein said one or more circuits are further configured to render personalized user interfaces for at least one electronic device of said first set of electronic devices.

11. The system according to claim 1, wherein said first set of data further comprises at least Global Positioning Satellite (GPS) coordinates of said vehicle.

12. The system according to claim 1, wherein
said plurality of services corresponds to cloud-based services, and
said cloud-based services correspond to at least one of automotive services, banking services, E-commerce services, home automation services, health-care services, location-based services, Information and Technology (IT) services, or infrastructure-based services.

13. The system according to claim 1, wherein said extraction of said specific information is based on a machine-learning algorithm.

14. A method, comprising:
in a server:
receiving a first set of data from an electronic control unit (ECU) of a vehicle, based on detection of an event, wherein
said event is detected by said ECU, and
said first set of data comprises breakdown information associated with breakdown of said vehicle;
receiving a second set of data from a database, based on said reception of said first set of data, wherein
said second set of data comprises an operating parameter of a first electronic device of a first set of electronic devices,
said database is external to each of said server and said vehicle,
each of said first set of electronic devices is associated with at least one service of a plurality of services,
said first electronic device is associated with a home automation service of said plurality of services, and said database is associated with said at least one service;

extracting specific information from said first set of data and said second set of data, based on analysis of said first set of data and said second set of data;

determining a response corresponding to said event, based on said specific information;

generating a control instruction based on said determined response, wherein said control instruction is generated when a user permission is required to change said operating parameter of said first electronic device; and transmitting said generated control instruction to a second electronic device of one of said first set of electronic devices or a second set of electronic devices.

15. The method according to claim 14, wherein said second set of electronic devices are controllable by said at least one service based on said determined response and an advisory application.

16. A non-transitory computer-readable medium having stored thereon computer-executable instructions, which when executed by a computer, cause said computer to execute operations, said operations comprising:

receiving a first set of data from an electronic control unit (ECU) of a vehicle based on detection of an event, wherein
said event is detected by said ECU, and
said first set of data comprises breakdown information associated with breakdown of said vehicle;

receiving a second set of data from a database, based on said reception of said first set of data, wherein
said second set of data comprises an operating parameter of a first electronic device of a first set of electronic devices,
said database is external to each of said server and said vehicle,
each of said first set of electronic devices is associated with at least one service of a plurality of services,
said first electronic device is associated with a home automation service of said plurality of services, and
said database is associated with said at least one service;

extracting specific information from said first set of data and said second set of data, based on analysis of said first set of data and said second set of data;

determining a response corresponding to said event, based on said specific information;

generating a control instruction based on said determined response, wherein said control instruction is generated when a user permission is required to change said operating parameter of said first electronic device; and transmitting said generated control instruction to a second electronic device of one of said first set of electronic devices or a second set of electronic devices.

17. A vehicle, comprising:

a battery;

a display device configured to be powered by said battery;

one or more circuits; and an electronic control unit (ECU) configured to:
detect an event; and
control said one or more circuits, wherein said one or more circuits are configured to:
generate a first set of data based on said event, wherein said first set of data comprises breakdown information associated with breakdown of said vehicle;
transmit said generated first set of data to a server, wherein
said server receives a second set of data from an external device, based on reception of said first set of data,
said external device is external to each of said server and said vehicle,
said second set of data comprises an operating parameter of a first electronic device of a set of electronic devices,
each of said set of electronic devices is associated with at least one service of a plurality of services, and
said first electronic device is associated with a home automation service of said plurality of services;
receive, from said server, a response corresponding to said transmitted first set of data, wherein
said received response is determined by said server, based on extraction of specific information and said breakdown information of said vehicle,
said extraction of said specific information is from said transmitted first set of data and said second set of data,
a control instruction is generated, by said server, based on said determined response,
said control instruction is generated when a user permission is required to change said operating parameter of said first electronic device, and
said generated control instruction is transmitted, by said server, to a second electronic device of said set of electronic devices; and
control said display device to display said received response.

* * * * *